(12) United States Patent
Peng et al.

(10) Patent No.: US 10,341,658 B2
(45) Date of Patent: Jul. 2, 2019

(54) MOTION, CODING, AND APPLICATION AWARE TEMPORAL AND SPATIAL FILTERING FOR VIDEO PRE-PROCESSING

(71) Applicant: Intel Corporation, Santa Clara, CA (US)

(72) Inventors: Ya-Ti Peng, Sunnyvale, CA (US); Yu-Ting Li, Campbell, CA (US); Ximin Zhang, San Jose, CA (US); Yi-Jen Chiu, San Jose, CA (US); Sang-Hee Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 15/419,493

(22) Filed: Jan. 30, 2017

(65) Prior Publication Data

US 2018/0220129 A1 Aug. 2, 2018

(51) Int. Cl.
*H04N 19/117* (2014.01)
*H04N 19/137* (2014.01)
*H04N 19/182* (2014.01)
*H04N 19/154* (2014.01)

(52) U.S. Cl.
CPC ......... *H04N 19/117* (2014.11); *H04N 19/137* (2014.11); *H04N 19/154* (2014.11); *H04N 19/182* (2014.11)

(58) Field of Classification Search
CPC .. H04N 19/117; H04N 19/157; H04N 19/154; H04N 19/182
See application file for complete search history.

(56) References Cited

U.S. PATENT DOCUMENTS

| | | | | |
|---|---|---|---|---|
| 6,067,125 A | * | 5/2000 | May | H04N 5/21 348/451 |
| 6,281,942 B1 | * | 8/2001 | Wang | H04N 5/21 348/606 |
| 8,081,224 B2 | * | 12/2011 | Lin | H04N 5/23267 348/208.1 |
| 2005/0280739 A1 | * | 12/2005 | Lin | H04N 5/144 348/607 |
| 2007/0092000 A1 | * | 4/2007 | Chen | H04N 19/61 375/240.03 |
| 2009/0167951 A1 | * | 7/2009 | Chiu | H04N 5/21 348/607 |
| 2010/0245672 A1 | * | 9/2010 | Erdler | H04N 19/139 348/608 |
| 2012/0019727 A1 | * | 1/2012 | Zhai | H04N 5/145 348/607 |

* cited by examiner

*Primary Examiner* — Robert J Hance
(74) *Attorney, Agent, or Firm* — Green, Howard & Mughal LLP.

(57) ABSTRACT

Techniques related to video pre-processing for video coding are discussed. Such video pre-processing techniques may include applying adaptive temporal and spatial filtering to pixel values of video frames of input video to generate pre-processed video such that the adaptive temporal and spatial filtering includes blending spatial and temporal filtering of the individual pixel value when the block of pixels is a non-motion block and spatial-only filtering the individual pixel value when the block of pixels is a motion block.

24 Claims, 8 Drawing Sheets

MOTION, CODING, AND APPLICATION AWARE TEMPORAL AND SPATIAL FILTERING FOR VIDEO PRE-PROCESSING

BACKGROUND

In compression/decompression (codec) systems, compression efficiency, video quality, and computational efficiency are important performance criteria. Furthermore, efficiently processing and encoding large amounts of media data is becoming increasingly critical due to the rapid growth of computer data centers for information storage, processing, and exchange.

Therefore, it may be advantageous to increase computational efficiency of encoders and decoders while enhancing video quality particularly in large scale video processing environments. It is with respect to these and other considerations that the present improvements have been needed.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
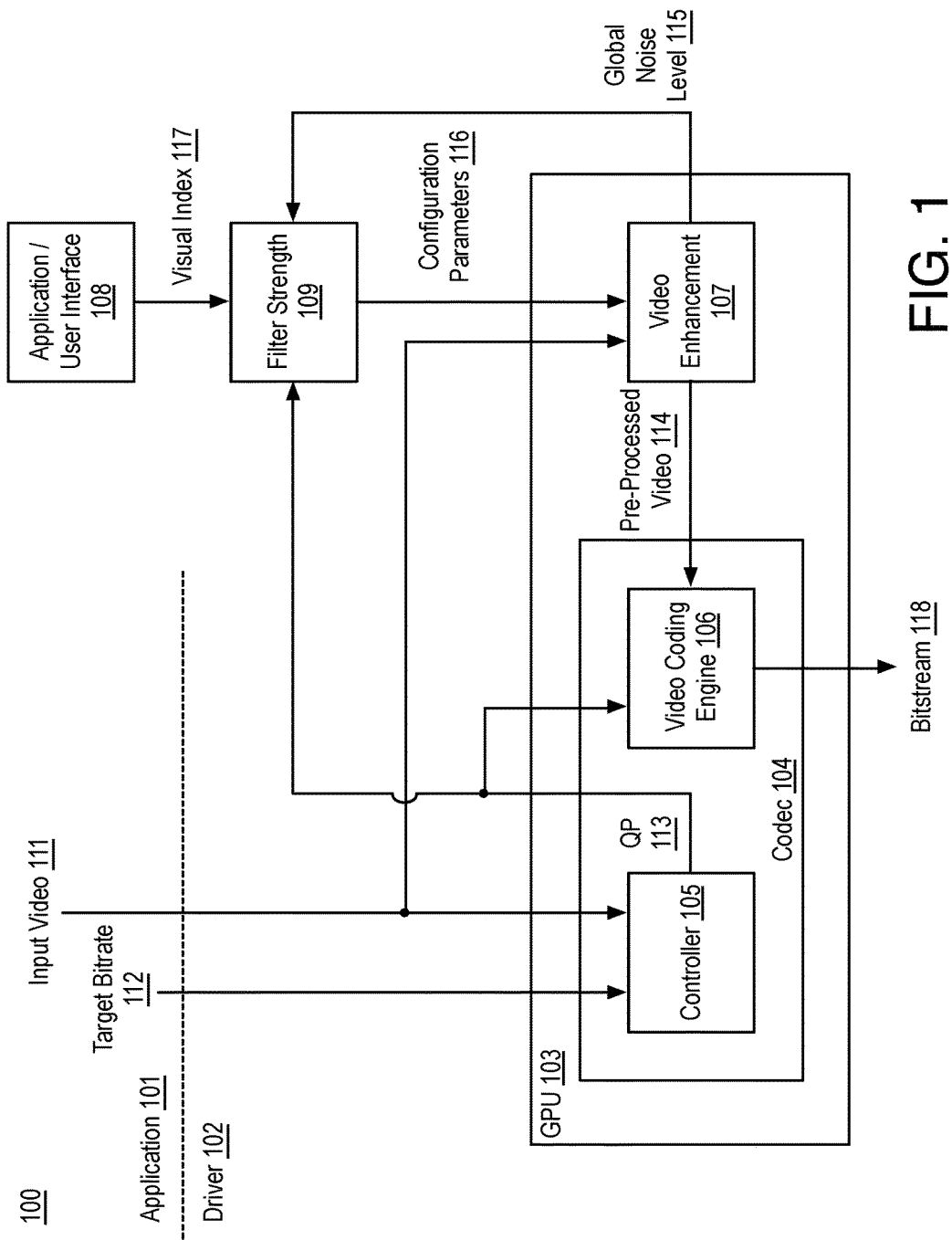
FIG. 1 is an illustrative diagram of an example system for providing video pre-processing and/or video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to pre-processing input video to generate pre-processed video for coding.

The discussed techniques and systems may provide coding aware, content aware, application aware, and/or motion aware configuration for video pre-processing. For example such video pre-processing may use spatial filtering, temporal filtering, or a blend of spatial and temporal filtering that is coding aware, content aware, application aware, motion aware, or the like to reduce or remove random spatial and/or temporal fluctuations in pixel values to improve subsequent video coding in terms of coding gain, video quality, and the like. Such techniques and systems may be used in any suitable computing environment such as data centers, large scale video processing systems, and the like. Furthermore, the discussed techniques may be used in any suitable coding context such as in the implementation of H.264/MPEG-4 advanced video coding (AVC) standards based codecs, high efficiency video coding (H.265/HEVC) standards based codecs, Alliance for Open Media (AOM) standards based codecs such as the AV1 standard, MPEG standards based codecs such as the MPEG-4 standard, VP9 standards based codecs, or any other suitable codec or extension or profile thereof.

As discussed further herein, adaptive temporal and spatial filtering may be applied to pixel values of video frames of input video to generate pre-processed video such that the adaptive temporal and spatial filtering includes, for an individual pixel value of a block of pixels of an individual video frame of the input video, blending spatial and temporal filtering of the individual pixel value when the block of pixels is a non-motion block and spatial-only filtering the individual pixel value when the block of pixels is a motion block. As used herein, the term spatial-only filtering and similar terms are used to mean a pixel value is filtered only using spatial filtering (i.e., filtering only using neighboring pixel values from within the same video frame) without use of temporal filtering. Furthermore, the spatial-only filtering and/or spatial portion of the blended spatial and temporal filtering may include determining a convolution of a neighborhood of pixels centered around and including the individual pixel and a two-dimensional filter function having an adaptive variance. The adaptive variance may be based on, for example, a quantization parameter, a global noise level, and a visual index corresponding to the individual pixel. The adaptive variance may be monotonic increasing function of the quantization parameter, the global noise level, and the visual index such that increasing spatial filtering is provided with increasing quantization parameters, global noise levels, and visual indices.

In some examples, for an individual pixel in a non-motion block (e.g., where a blend of spatial and temporal filtering are applied), a spatial filtering output value and a temporal filtering output value may be determined for the individual pixel value and they may be blended based on a temporal filtering weight. For example, the output pixel value for the individual pixel may be a weighted average of the spatial filtering output value and the temporal filtering output value. For example, the temporal filtering output value may be multiplied by the temporal filtering weight and the spatial filtering output value may be multiplied by one minus the temporal filtering weight and a sum of the products may provide the output pixel value for the individual pixel. Furthermore, the temporal filtering weight may be a monotonic increasing function of the quantization parameter, the global noise level, and the visual index such that the blend of spatial and temporal filtering provides increased temporal filtering (over spatial filtering) with increasing quantization parameters, global noise levels, and visual indices.

In some examples, the discussed temporal filtering may include a weighted average of the individual pixel value (e.g., at a current time instance) and a previous pixel value from a second video frame (e.g., at a prior time instance) such that the previous pixel value is co-located with the individual pixel value. For example, the temporal filtering output value for the individual pixel may be a weighted average of the individual pixel value and the previous pixel value. For example, the previous pixel value may be multiplied by a previous pixel filtering weight and the individual pixel value may be multiplied by one minus the previous pixel filtering weight and a sum of the products may provide the temporal filtering output value for the individual pixel.

Furthermore, the previous pixel filtering weight may be monotonic increasing function of the quantization parameter, the global noise level, and the visual index such that the temporal filtering provides increased temporal filtering (e.g., use of the previous pixel value) with increasing quantization parameters, global noise levels, and visual indices.

As is discussed further herein, the quantization parameters, global noise levels, and/or visual indices may be determined based on temporally previous frames and/or overarching video analysis or control parameters such that filtering of a current frame may be performed in parallel with encoding a temporally subsequent (and previously enhanced or filtered) video frame. In some embodiments, the video frame enhancement through spatial filtering, temporal filtering, and/or a blend of spatial and temporal filtering may be implemented via dedicated fixed function (FF) hardware (HW) and execution units (EU) of, for example, a graphics processing unit (GPU), video processor, or the like. Similarly, the video encode operations discussed herein may be implemented via dedicated fixed function hardware, and execution units, of a graphics processing unit, video processor, or the like. As discussed, in some embodiments, such video frame enhancement and video encode operations may be configured to run in parallel for increased efficiency. The discussed techniques may provide increased bit reduction at the same visual quality (e.g., visual index) and/or increased visual quality at the same bit rate.

FIG. 1 is an illustrative diagram of an example system 100 for providing video pre-processing and/or video coding, arranged in accordance with at least some implementations of the present disclosure. As shown in FIG. 1, system 100 may include an application layer 101 and a driver layer 102. Furthermore, application layer 101 may include or implement an application and/or user interface 108 and driver layer 102 may include or implement a filter strength module 109 and a graphics processing unit 103. Also as shown, graphics processing unit 103 may include or implement a codec 104, which may include or implement a controller 105 and a video coding engine 106, and a video enhancement module 107.

Also as shown, controller 105 and video enhancement module 107 may receive input video 111. Other modules or components of system 100 may also receive input video 111 or portions thereof as needed. System 100 may provide, for example, video compression and system 100 may be a video encoder implemented via a computer or computing device or the like. For example, system 100 may generate a bitstream 118 that is compatible with a video compression-decompression (codec) standard such as the H.264/MPEG-4 advanced video coding (AVC) standard, the high efficiency video coding (HEVC) standard, the VP8 standard, the VP9 standard, or the like. System 100 may be implemented via any suitable device such as, for example, a server, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

Figure 7:
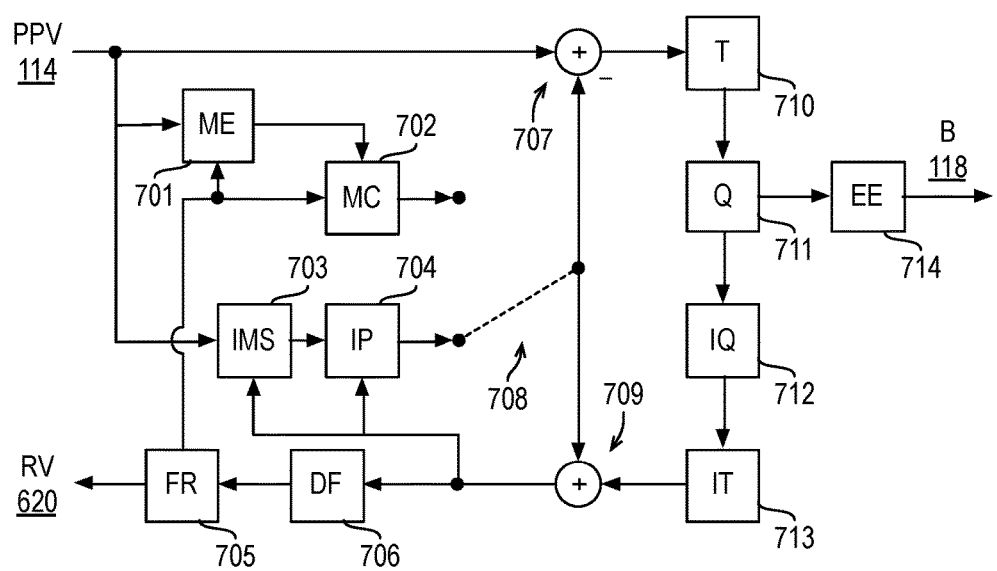
FIG. 7 illustrates a block diagram of an example encoder.

System 100 may include other modules or components such as those discussed with respect to FIG. 7, which are not shown in FIG. 1 for the sake of clarity of presentation. For example, codec 104 of system 100 may include a transform module, an intra prediction module, a motion estimation module, a motion compensation module, an in-loop filtering module, a reference frame buffer, a scanning module, or the like. In some examples, system 100 may include a local decode loop for generating reference frames used in the encoding process.

As discussed, controller 105 and video enhancement module 107 may receive input video 111. Input video 111 may include any suitable video data, video sequence, pictures of a video sequence, video frames, video pictures, sequence of video frames, group of pictures, groups of pictures, video data, or the like in any suitable resolution. Input video 111 may be characterized as video, input video data, video data, raw video, or the like. For example, input video 111 may be video graphics array (VGA), high definition (HD), Full-HD (e.g., 1080p), or 4K resolution video, or the like. Furthermore, input video 111 may include any number of video frames, sequences of video frames, pictures, groups of pictures, or the like. In an embodiment, input video 111 may have an IPPP coding structure. Techniques discussed herein are discussed with respect to pixels and pixel values of video frames for the sake of clarity of presentation. However, such video frames and/or video data may be characterized as pictures, video pictures, frames, sequences of frames, video sequences, or the like. In various examples, input video 111 may be raw video (e.g., from a video capture device) or decoded video (e.g., decoded from a bitstream). In an embodiment, input video 111 may be provided from codec 104 based on a received bitstream (not shown). For example, codec 104 may provide both encode and decode functionality. As used herein, the term pixel value may include a value representing a pixel of a video frame such as a luminance value for the pixel, a color channel value for the pixel, or the like.

As shown in FIG. 1, video enhancement module 107 may receive input video 111 and configuration parameters 116 and video enhancement module 107 may generate pre-processed video 114. For example, configuration parameters 116 may include parameters for filtering or enhancing input video 111 such as spatial filter variances, spatial filter neighborhoods, temporal filtering weights, previous pixel filtering weights, or the like as discussed further herein. Pre-processed video 114 may provide, with respect to input video 111, smoothing of random fluctuations in pixel values. Video enhancement module 107 may provide spatial filtering, temporal filtering, and/or blended spatial and temporal filtering as discussed further herein. In some embodiments, video enhancement module 107 may be characterized as a filtering module, a motion aware filter, a coding aware filter, or the like. The described configuration and corresponding control scheme(s) linking video enhancement module 107 and codec 104 provide improved coding and/or transcoding quality. Furthermore, as discussed further herein, the level of filtering may be motion adaptive or aware, content adaptive or aware, and/or coding adaptive or aware (e.g., aware of target bit rate). Such techniques may provide coding gain while maintaining or improving subjective visual quality of encoded video streams.

Video enhancement module 107 may provide pre-processed video 114 based on input video 111 using any suitable technique or techniques. In an embodiment, video enhancement module 107 may apply adaptive temporal and spatial filtering to pixel values of video frames of input video 111 to generate pre-processed video 114. In an embodiment, the adaptive temporal and spatial filtering includes, for an individual pixel value of a block of pixels of an individual video frame of the input video data, blending spatial and temporal filtering of the individual pixel value when the block of pixels is a non-motion block and spatial-only filtering the individual pixel value when the block of pixels is a motion block. The determination of whether an individual pixel is in a block of pixels that is a motion or non-motion block may be made using any suitable technique or techniques. In an embodiment, an average motion vector for the block of pixels may be determined and the magnitude of the average motion vector may be compared to a threshold to determine whether the block is a motion or non-motion block.

In another embodiment, a co-located block in a temporally previous video frame of input video 111 may be evaluated to determine whether the block of the current frame is a motion or non-motion block. Although such techniques may provide greater risk of mistakes in determining motion or non-motion blocks in the current video frame, such techniques may provide for the ability to process a current video frame at video enhancement module 107 without waiting for pre-processing of the frame by codec 104 to determine motion vectors for the frame. In other embodiments, motion blocks or regions of frames over time may be tracked to predict whether a pixel of a current frame is in a motion block or region.

As discussed, video enhancement module 107 may apply adaptive temporal and spatial filtering to pixel values of video frames of input video 111 to generate pre-processed video 114 such that the adaptive temporal and spatial filtering includes, for an individual pixel value of a block of pixels of an individual video frame of the input video data, blending spatial and temporal filtering of the individual pixel value when the block of pixels is a non-motion block and spatial-only filtering the individual pixel value when the block of pixels is a motion block. In an embodiment, such techniques may be applied based Equation (1) as follows:

$$p_{out}(x, y, t) = \begin{cases} S(p_{in}(x, y, t)), \text{ if } MB_{flag}(p_{in}(x, y, t)) == \text{true} \\ S(p_{in}(x, y, t)) \times (1 - \alpha) + T(p_{in}(x, y, t)) \times \alpha, \text{ else}; \alpha \in (0, 1) \end{cases} \quad (1)$$

where $p_{in}(x,y,t)$ and $p_{out}(x,y,t)$ are input and output values of an individual pixel located at position (x,y,t) within video frame t, $MB_{flag}$ is a flag or the like that indicates whether pixel $p_{in}(x,y,t)$ is a motion block or not, $S(p_{in}(x,y,t))$ provides the spatial filtered result for the pixel, $T(p_{in}(x,y,t))$ provides the temporal filtered result for the pixel, and a provides a temporal filtering weight for the pixel.

Figure 3:
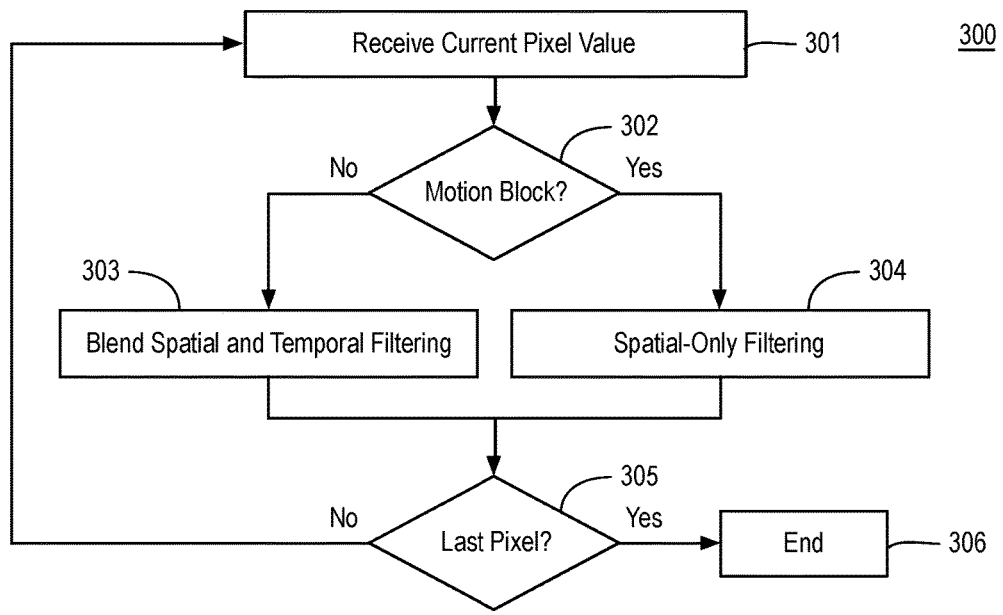
FIG. 3 is a flow diagram illustrating an example process for applying adaptive temporal and spatial filtering to pixel values of a current video frame.

As is discussed further with respect to FIG. 3, for each pixel or some pixels or the like of a current frame, a determination may be made as to whether the pixel is a motion pixel or within a motion block. If so, spatial only filtering may be provided for the pixel. If not, a blend of spatial and temporal filtering may be provided for the pixel. The blend of spatial and temporal filtering may be provided by a weighted average of a spatial filtering output value for the individual pixel value and a temporal filtering output value for the individual pixel value weighted based on the discussed temporal filtering weight. In an embodiment, the temporal filtering output value is multiplied by the temporal filtering weight and the spatial filtering output value is multiplied by one minus the temporal filtering weight and the sum of the products provides the blended output value for the individual pixel. As discussed, the blend of spatial and temporal filtering may be provided by a weighted average of a spatial filtering output value for the individual pixel value and a temporal filtering output value for the individual pixel value weighted based on the discussed temporal filtering weight. Alternatively, the blend of spatial and temporal filtering may be provided by a weighted average of a spatial filtering output value for the individual pixel value and a temporal filtering output value for the individual pixel value weighted based on a spatial filtering weight. For example, the spatial filtering output value may be multiplied by the spatial filtering weight and the temporal filtering output value may be multiplied by one minus the spatial filtering weight and the sum of the products may provide the blended output value for the individual pixel. As is discussed further below with respect to Equations (5), the temporal filtering weight or spatial filtering weight may be adaptive based on coding parameters, global noise level, and/or application parameters.

The spatial and temporal filtering for the pixel may be performed using any suitable technique or techniques. In an embodiment, the spatial-only filtering and the spatial filtering of the blended spatial and temporal filtering may be the same type of spatial filtering. In other embodiments, they may be different. In an embodiment, the spatial-only filtering and/or the spatial filtering of the blended spatial and temporal filtering may include a convolution of a neighborhood of pixels centered around and including the individual pixel and a two-dimensional filter function having an adaptive variance. In an embodiment, a neighborhood of pixels (e.g., pixel values) centered around and including the individual pixel is a square neighborhood having a size of N×N pixels. In an embodiment, the two-dimensional filter function is a Gaussian function with an adaptive variance. In an embodiment, the spatial filtering is provided as shown with respect to Equation (2):

$$S(p_{in}(x,y,t))=pN_{in}(x,y,t)*G(\sigma_x,\sigma_y) \quad (2)$$

where $pN_{in}(x,y,t)$ represents a neighborhood of pixels centered around and including pixel $p_{in}(x,y,t)$ (e.g., representing an N×N neighborhood of pixels centered around (x,y)), $G(\sigma_x,\sigma_y)$ represents a two-dimensional filter function having an adaptive variance $(\sigma_x,\sigma_y)$ (e.g., $G(\sigma_x,\sigma_y)$ may be a Gaussian function with variance $(\sigma_x,\sigma_y)$), and * represents a convolution operation.

In an embodiment, the temporal filtering for the pixel may be a weighted average of the individual pixel value and a previous pixel value (e.g., a pixel value for a co-located pixel from a temporally previous or prior frame) weighted based on a previous pixel filtering weight for the individual pixel value. In an embodiment, the previous pixel value is multiplied by the previous pixel filtering weight and the individual pixel value is multiplied by one minus the previous pixel filtering weight and the sum of the products provides the temporal filtering output value for the individual pixel. In an embodiment, the temporal filtering is provided as shown in Equation (3):

$$T(p_{in}(x,y,t))=p_{in}(x,y,t)\times(1-\beta)+p_{out}(x,y,t-1)\times\beta; \beta\in(0,1) \quad (3)$$

where $p_{in}(x,y,t)$ is the individual pixel value (e.g., at a current time, t), $p_{out}(x,y,t-1)$ is the previous pixel value (e.g., at a previous time, t−1), and β is the previous pixel filtering weight. The previous pixel filtering weight may be characterized as temporal filtering strength weight, a past pixel filter weight, or the like. Alternatively, the weighted averaging may be provided by a current pixel filtering weight. For example, the current pixel value may be multiplied by the current pixel filtering weight and the previous pixel value may be multiplied by one minus the current pixel filtering weight and the sum of the products may provide the temporal filtering output value for the individual pixel. As is discussed further below with respect to Equations (5), the previous pixel filtering weight or current pixel filtering weight may be adaptive based on coding parameters, global noise level, and/or application parameters.

In an embodiment, the previous pixel value, $p_{out}(x,y,t-1)$, is a pixel value from a previous output from video enhancement module 107. For example, the previous pixel value may be from a previous video frame of pre-processed video 114 such that the previous pixel value is from a pixel co-located (e.g., at a same position within the respective frame) with respect to the individual pixel being enhanced. Use of such previous pixel values as reference values for temporal filtering may be characterized as out-of-loop pre-filtering. Such previously pre-processed video frames may be characterized as enhanced video frames, pre-processed video frames, prior adaptive temporal and spatial filtered video frames, or the like.

In another embodiment, the previous pixel value, $p_{out}(x,y,t-1)$, is a pixel value from a reference video frame from codec 104. For example, the previous pixel value may be from a previous reference video frame from codec 104 (e.g., a frame stored to a reference buffer or the like) such that the previous pixel value is from a pixel co-located (e.g., at a same position within the respective frame) with respect to the individual pixel being enhanced. For example, the reference video frame(s) may be generated in a local decode loop of an encoder for use as reference video frames for the coding of temporally subsequent frames. Use of such previous pixel values as reference values for temporal filtering may be characterized as in-loop pre-filtering as such reference video frames are reconstructed in a local decode loop as is discussed further herein with respect to FIG. 7.

The discussed pixel level processing may be applied by video enhancement module 107 for each pixel or some pixels of each video frame or some video frames of input video 111 to generate pre-processed video 114. For example, such pixel level processing may be disabled on a frame level (e.g., for certain frame types), on a slice or block level (e.g., for certain slice or block types), or the like.

As discussed, the temporal filtering weight (or spatial filtering weight) described with respect to Equation (1) (e.g., α), the filter function variance described with respect to Equation (2) (e.g., $(\sigma_x,\sigma_y)$), and/or the previous pixel filtering weight (or current pixel filtering weight) described with respect to Equation (3) (e.g., β) may be adaptive. In an embodiment, one or more of such parameters (e.g., α, $(\sigma_x,\sigma_y)$, and β) are adaptive to a coding parameter corresponding to the individual pixel. For example, the coding parameter may be a quantization parameter or the like. In an embodiment, one or more of such parameters are adaptive to a global noise level corresponding to the individual pixel. In an embodiment, one or more of such parameters are adaptive to an application parameter corresponding to the individual pixel. For example, the application parameter may be a visual index or the like. For example, the visual index may have a low value for low visual loss and smoothing and a higher value for greater visual loss and smoothing.

As discussed, filtering or enhancement parameters may be based on or responsive to coding parameters such that the coding parameters include a quantization parameter. In other examples, the coding parameters may include a frame coding type (e.g., intra or inter prediction frame) or the like. The discussed filtering or enhancement parameters may be based on such a frame coding type in addition to or in the alternative to being based on the quantization parameter. For example, stronger spatial filtering may be applied to inter prediction frames over intra prediction frames, greater previous pixel weighting may be applied to inter prediction frames over intra prediction frames, and stronger temporal filter weighting may be applied to inter prediction frames over intra prediction frames. Similarly, other application parameters in addition to or in the alternative to the discussed visual index may be provided such that the filtering or enhancement parameters may be based on or responsive to such application parameters. For example, application parameters including frame rate or the like may be received. For example, stronger spatial filtering may be applied at higher frame rates, greater previous pixel weighting may be applied at higher frame rates, and stronger temporal filter weighting may be applied at higher frame rates.

With continued reference to FIG. 1, as shown, application and/or user interface 108 may provide one or more application parameters such as visual index 117 to filter strength module 109. Visual index 117 may be determined using any suitable technique or techniques. In an embodiment, visual index 117 may be generated by an application controlling the coding of input video 111. In an embodiment, a user interface such as an application character user interface (CUI) or the like may be provided such that a user may control the subjective quality. Such a visual index 117 as provided by an application or a user may guide the discussed content adaptive and coding aware filtering toward stronger or weaker filtering according to preference, need, or the like. For example, an application or user may select visual index 117 such that visual index 117 may have a low value for low visual loss and smoothing and a higher value for greater visual loss and smoothing. For example, visual index 117 may have a value or index indicating options of visual lossless (e.g., low amounts of filtering), moderate smoothing (e.g., a bit of smoothing visual effect), or strong smoothing (e.g., providing strong smoothing of visual effect). Although discussed with respect to three levels of indexing, visual index 117 may be implemented with any number of levels such as two, four, five, or more. In an embodiment, visual index 117 may be implemented as shown with respect to Equation (4):

$$\text{Visual Index} = \begin{cases} 0, \text{ visually lossless} \\ 1, \text{ a bit smoother visual effect} \\ 2, \text{ strong denoise/smooth effect} \end{cases} \quad (4)$$

where the visual index may be indexed as 0 for visually lossless (e.g., low amounts of filtering or no filtering), indexed as 1 for moderate smoothing (e.g., a bit of smoothing visual effect), and 2 for strong smoothing (e.g., providing strong smoothing of visual effect).

Also as shown in FIG. 1, controller 105 of codec 104 may generate, based on target bitrate 112 and input video 111, quantization parameter (QP) 113. As shown, in an embodiment, application layer 101 may provide target bitrate 112 and input video 111 to codec 104 for coding. Application layer 101 may generate target bitrate 112 using any suitable technique or techniques. Furthermore, controller 105 may generate quantization parameter 113 using any suitable technique or techniques such as bit rate control (BRC) techniques. As discussed, a quantization parameter of quantization parameters 113 from a temporally previous frame may be used to generate configurations parameters 116 for a current frame such that video enhancement module 107 may provide enhancement of the current video frame in parallel with the encoding of the temporally previous enhanced video frame (e.g., the previous QP may be used at the expense of accuracy to provide increased processing efficiency).

Furthermore, video enhancement module 107 may generate, based on input video 111, global noise level 115, which may be characterized as a global noise level (GNE) or the like. Video enhancement module 107 may generate global noise level 115 using any suitable technique or techniques such as measuring pixel neighbor variations, measuring Gaussian noise within video frames, tracking global noise estimations over video frames, or the like.

As shown, quantization parameter 113, global noise level 115, and visual index 117 may be provided to filter strength module 109, which may determine one or more of the temporal filtering weight (or spatial filtering weight), the filter function variance, and the previous pixel filtering weight (or current pixel filtering weight) based on one or more of quantization parameter 113, global noise level 115, and visual index 117. In an embodiment, each of the temporal filtering weight, the filter function variance, and the previous pixel filtering weight are monotonic increasing functions of quantization parameter 113, global noise level 115, and visual index 117. Alternatively, a spatial filtering weight and a current pixel filtering weight (if used) may be monotonic decreasing functions of quantization parameter 113, global noise level 115, and visual index 117.

For example, the filter function variance may provide increased spatial filtering (e.g., in the spatial-only filtering or in the spatial filtering to be blended with temporal filtering) when higher QPs are used (e.g., as video image quality may become lower), higher global noise exists (e.g., as video image quality is lower), and the visual index indicates greater smoothing is desired. Similarly, the filter function variance may provide decreased spatial filtering when lower QPs are used (e.g., as video image quality may become higher), lower global noise exists (e.g., as video image quality is higher), and the visual index indicates less smoothing is desired.

Also, the temporal filtering weight may provide increased temporal filtering (e.g., in the blend with spatial filtering as discussed) when higher QPs are used (e.g., as video image quality may become lower), higher global noise exists (e.g., as video image quality is lower), and the visual index indicates greater smoothing is desired. Similarly, the temporal filtering weight may provide decreased temporal filtering when lower QPs are used (e.g., as video image quality may become higher), lower global noise exists (e.g., as video image quality is higher), and the visual index indicates less smoothing is desired.

Furthermore, the previous pixel filtering weight may provide increased dependence on the previous pixel value (e.g., in the weighted averaging with the current pixel value as discussed) when higher QPs are used (e.g., as video image quality may become lower), higher global noise exists (e.g., as video image quality is lower), and the visual index indicates greater smoothing is desired. Similarly, the previous pixel filtering weight may provide decreased temporal filtering (e.g., in the blend with spatial filtering as discussed) when lower QPs are used (e.g., as video image quality may become higher), lower global noise exists (e.g., as video image quality is higher), and the visual index indicates less smoothing is desired.

In an embodiment, one or more of the temporal filtering weight, the filter function variance, and/or the previous pixel filtering weight may be determined as shown with respect to Equations (5):

$$\sigma_x = \sigma_y = F_S(QP, GN, VI)$$

$$\alpha = F_{T1}(QP, GN, VI)$$

$$\beta = F_{T2}(QP, GN, VI) \quad (5)$$

where QP is the quantization parameter, GN is the global noise, VI is the visual index, and $F_S(QP,GN,VI)$, $F_{T1}(QP, GN,VI)$, and $F_{T2}(QP, GN, VI)$ are monotonic increasing functions (e.g., a non-decreasing function such that the first derivative of the monotonic increasing functions does not change signs).

As shown in FIG. 1, pre-processed video 114 is transferred from video enhancement module 107 to video coding engine 106 of codec 104 for coding to generate bitstream 118. Codec 104 may implement any suitable coding techniques to generate bitstream 118 and bitstream 118 may include any suitable data. For example, codec 104 may implement H.264/MPEG-4 advanced video coding (AVC) standards based codecs, high efficiency video coding (H.265/HEVC) standards based codecs, Alliance for Open Media (AOM) standards based codecs such as the AV1 standard, MPEG standards based codecs such as the MPEG-4 standard, VP9 standards based codecs, or any other suitable codec or extension or profile thereof and bitstream 118 may include a corresponding standards compliant bitstream.

Bitstream 118 may be stored to memory (not shown in FIG. 1), transmitted to another device, decoded to generate reconstructed video, which may be displayed, or the like. In an embodiment, prior to display, the decoded reconstructed video may be provided to video enhancement module 107 for post-processing. Such processing may be performed using techniques as discussed herein with respect to the processing of input video 111.

As discussed, system 100 provides video pre-processing such that video encoding may be applied to smoother video to attain video coding gains. Such pre-processing may use analytic information from both the pre-processor and the encoder to set content-adaptive and coding-aware pre-processing filtering strengths or levels. Furthermore, a user interface is provided to allow applications or users to adjust the amount or level of pre-processing filtering according to preference of subjective video quality.

Figure 2:
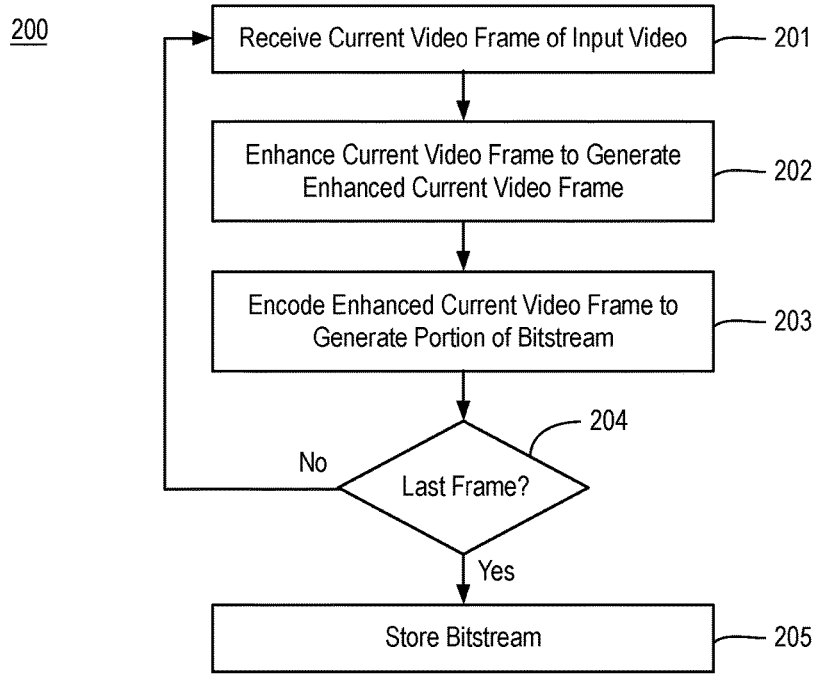
FIG. 2 is a flow diagram illustrating an example process for video coding including pre-processing.

FIG. 2 is a flow diagram illustrating an example process 200 for video coding including pre-processing, arranged in accordance with at least some implementations of the present disclosure. Process 200 may include one or more operations 201-205 as illustrated in FIG. 2. Process 200 may be performed by a device (e.g., system 100 or any other system or device discussed herein) to enhance and code a video sequence, video input data, or the like. Process 200 may be repeated for any number of video sequences or the like. Furthermore, FIGS. 2-5 and related operations will be discussed with respect to FIG. 6.

Figure 6:
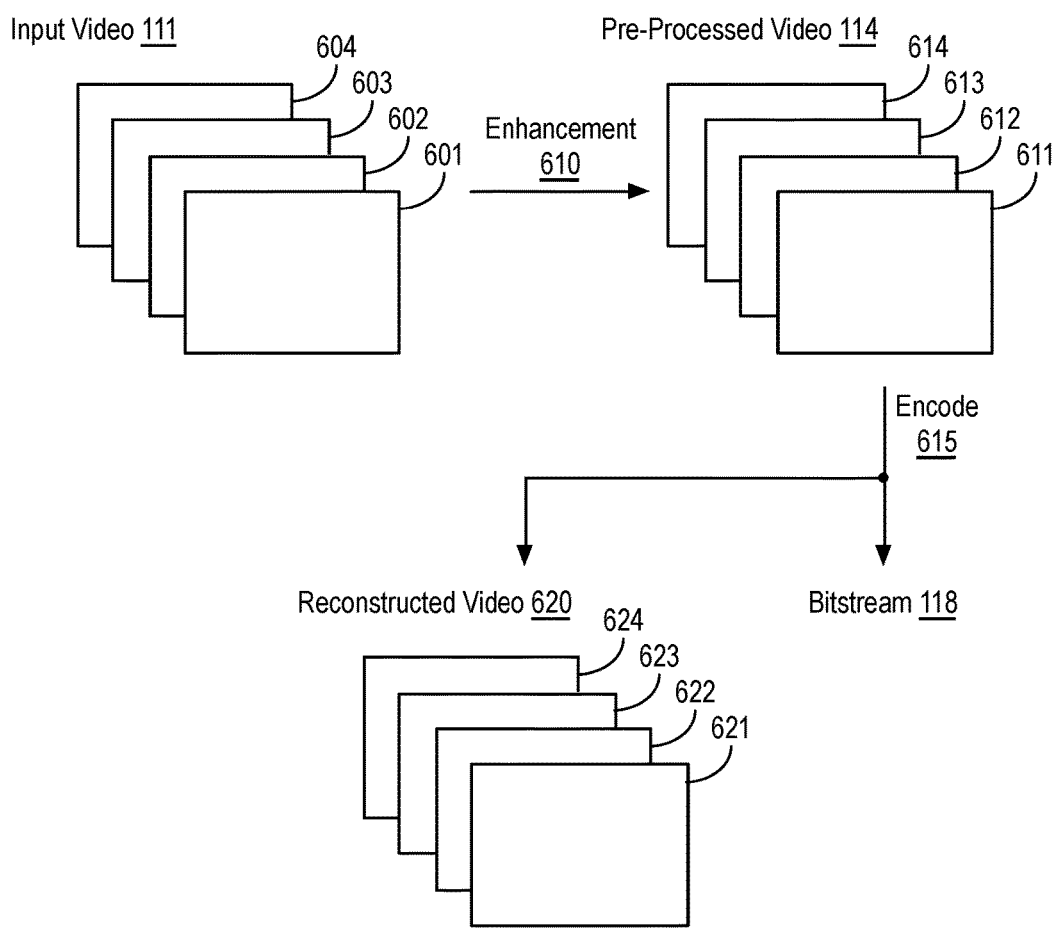
FIG. 6 illustrates an example processing environment including input video, pre-processed video, an encoded bitstream, and reconstructed video.

FIG. 6 illustrates an example processing environment 600 including input video 111, pre-processed video 114, encoded bitstream 118, and reconstructed video 620, arranged in accordance with at least some implementations of the present disclosure. As shown in FIG. 6, input video 111 may include multiple sequential video frames such as video frames 601, 602, 603, 604. For example, video frames 601-604 may be in a temporal order (e.g., presentation order, coding order, or both) such that video frame 603 corresponds to a current video frame at time t, video frame 604 corresponds to a subsequent video frames at time t+1, and video frames 602, 601 correspond to prior video frames at times t−1 and t−2, respectively. Similarly, pre-processed video 114 may include filtered or enhanced video frames 611, 612, 613, 614 such that each of enhanced video frames 611-614 correspond temporally to video frames 601-604. Furthermore, reconstructed video 620, which is discussed further below, may include reconstructed video frames 621, 622, 623, 624 such that each of reconstructed video frames 621-624 correspond temporally to video frames 601-604 and enhanced video frames 611-614.

Returning to FIG. 2, process 200 may begin at operation 201, where a current video frame of input video may be received for processing. The input video and current video frame may be obtained using any suitable technique or techniques. In an embodiment, the input video may be received by a system such as system 100 for encode processing. For example, the input video and a target bitrate may be received by a driver layer from an application layer for processing. At a first iteration of operation 201, a first video frame of a sequence may be received and at each subsequent iteration, a subsequent video frame may be received. With reference to FIG. 6, video frames 601-604 and so on may each be received at each subsequent iteration of operation 201.

Processing may continue at operation 202, where the current video frame received at operation 201 may be enhanced or filtered or the like as discussed herein to generate a corresponding enhanced current video frame. The current video frame may be enhanced using any suitable technique or techniques discussed herein. In an embodiment, operation 202 may enhance the current video frame as discussed with respect to FIG. 3 herein below. With reference to FIG. 6, at each iteration of operation 202, enhancement 610 may be performed to generate, from each of video frames 601-604, a corresponding enhanced video frame of enhanced video frames 611-614.

Processing may continue at operation 203, where the enhanced current video frame may be encoded to generate a portion of a bitstream and, as part of the encode process, to generate a reconstructed video frame. The current enhanced video frame may be encoded using any suitable technique or techniques to generate a bitstream such as a standards compliant bitstream. In an embodiment, operation 203 may encode the current enhanced video frame as discussed with respect to FIG. 7 herein below. With reference to FIG. 6, at each iteration of operation 203, encode 615 may be performed to generate, from each of enhanced video frames 611-614, a corresponding portion of bitstream 118 as well as a corresponding reconstructed video frame of reconstructed video frames 621-624. For example, reconstructed video frames 621-624 may be generated by a local decode loop of the encoding process.

Processing may continue at decision operation 204, where a determination may be made as to whether the current frame is a last video frame for processing. If not, processing may continue at operation 201 as discussed until a last video frame is reached. If so, processing may continue at operation at operation 205, where the bitstream may be stored to memory, transmitted to a remote device, or the like. With reference to FIG. 6, after completion of all iterations of operations 201-203, bitstream 118 may be stored to memory, transmitted, or the like.

In an embodiment, operation 202 may include applying adaptive temporal and spatial filtering to pixel values of the current video frame of the input video to generate pre-processed video.

FIG. 3 is a flow diagram illustrating an example process 300 for applying adaptive temporal and spatial filtering to pixel values of a current video frame, arranged in accordance with at least some implementations of the present disclosure. For example, process 300 may be performed at operation 202 of process 200. Process 300 may include one or more operations 301-306 as illustrated in FIG. 3. Process 300 may be performed by a device (e.g., system 100 or any other system or device discussed herein) to enhance a video frame, input video, video input data, or the like. Process 300 may be repeated for any number of video frames or the like.

Process 300 may begin at operation 301, where a current pixel value of a current video frame may be received for processing. The input video, current video frame, and current pixel value may be obtained using any suitable technique or techniques. For example, the current pixel value may be selected in a raster order or the like with respect to the current video frame for processing. At a first iteration of operation 301, a first pixel value corresponding to a first pixel location of a sequence may be received or selected and at each subsequent iteration, a subsequent pixel value corresponding to a subsequent pixel position may be received or selected. Other pixel values from the current video frame as well as other video frames may also be accessed or received as needed for processing the current pixel value.

Processing may continue at decision operation 302, where a determination may be made as to whether the current pixel value is a motion pixel. In an embodiment, the determination may be made at a block level such that if the pixel value is in a motion block, the pixel is a motion pixel and, if not, the pixel is a non-motion pixel. The block level determination as to whether blocks are motion or non-motion blocks may be made using any suitable technique or techniques. In an embodiment, an average motion vector for the block of pixels may be determined and the magnitude of the average motion vector may be compared to a threshold to determine whether the block is a motion or non-motion block. In another embodiment, a co-located block in a temporally previous video frame of input video 111 may be evaluated to determine whether the block of the current frame is a motion or non-motion block. In other embodiments, motion blocks or regions of frames over time may be tracked to predict whether a pixel of a current frame is in a motion block or region. With reference to FIG. 6, for processing current video frame 603, the determination as to whether pixel values of video frame 603 are motion pixels (e.g., whether the blocks corresponding to the pixels are motion blocks) may be made based on temporally previous video frames. For example, a motion field generated during encode 615 of enhanced video frame 612 (or enhanced video frame 611) may be used to determine whether blocks of (and thereby pixels) of video frame 603 are motion or non-motion blocks. Such processing may allow for the parallel processing of encode 615 of enhanced video frame 612 and enhancement 610 of current video frame 613.

In another example, a motion field may be generated based on current video frame 603 (based on any of prior video frames 602, 612, 622, for example) without a full encode procedure. Such a motion field may be generated by a motion search and the resultant motion vectors may be used to determine whether blocks of (and thereby pixels) of video frame 603 are motion or non-motion blocks.

Figure 4:
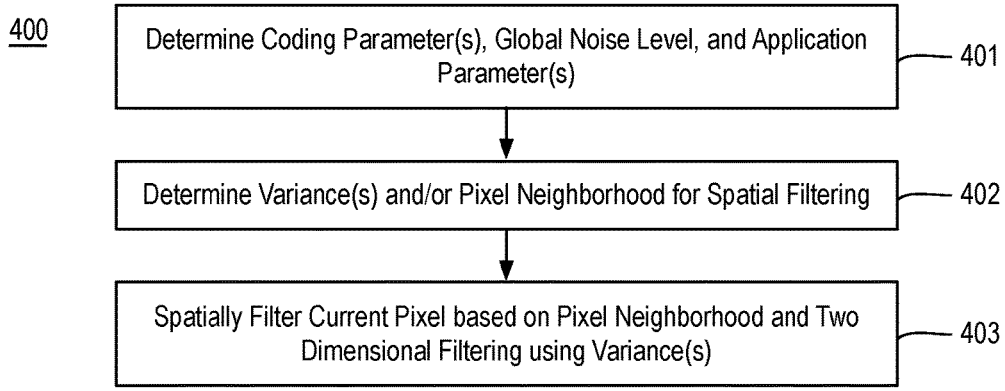
FIG. 4 is a flow diagram illustrating an example process for spatial-only filtering pixel values of a current video frame.

If the current pixel value corresponds to a motion pixel, processing continues at operation 304, where spatial only filtering may be applied to the current pixel value as discussed with respect to FIG. 4 and elsewhere herein. If the current pixel value corresponds to a non-motion pixel, processing continues at operation 303, where a blend of spatial filtering and temporal filtering may be applied to the current pixel value as discussed with respect to FIG. 5 and elsewhere herein.

After the enhanced or filtered pixel value is determined for the current pixel value, processing may continue at decision operation 305, where a determination may be made as to whether the current pixel is a last pixel for processing. If not, processing may continue at operation 301 as discussed until a pixel is reached. If so, processing may continue at operation at operation 306, where processing may end and the enhanced or filtered video frame may be output. With reference to FIG. 6, after completion of all iterations of operations 301-303/304, an enhanced video frame of pre-processed video 114 is generated from a video frame of input video 111. For example, enhanced video frames 613 may be generated from video frame 603 via process 300.

In an embodiment, operation 304 may include determining at least one coding parameter corresponding to the individual pixel of the individual video frame, determining a global noise level corresponding to the individual pixel of the individual video frame, and receiving at least one application parameter corresponding to the individual pixel of the individual video frame such that the spatial-only filtering applied at operation 303 is responsive to one or more of the coding parameter, the global noise level, and the application parameter.

FIG. 4 is a flow diagram illustrating an example process 400 for spatial-only filtering pixel values of a current video frame, arranged in accordance with at least some implementations of the present disclosure. For example, process 400 may be performed at operation 304 of process 300. Process 400 may include one or more operations 401-403 as illustrated in FIG. 4. Process 400 may be performed by a device (e.g., system 100 or any other system or device discussed herein) to enhance a video frame, input video, video input data, or the like. Process 400 may be repeated for any number of pixels, pixel values, or the like.

Process 400 may begin at operation 401, where coding parameter(s), a global noise level, and application parameter(s) may be determined for a pixel value. The coding parameter(s), global noise level, and application parameter(s) may be determined using any suitable technique or techniques. Such parameters may be determined, for a pixel, at a pixel level (e.g., pixel by pixel), at a block level, at a frame level, or at a video sequence level. In an embodiment, the coding parameter(s) include a quantization parameter as discussed herein. In an embodiment, the application parameter(s) include a visual index as discussed herein.

Furthermore, the parameters determined at operation 401 may be determined based on a video frame or frames temporally prior to the current video frame being enhanced or without need of the current video frame being enhanced. As discussed, such processing may provide for the current video frame to be enhanced simultaneously with an encode of prior video frame(s). With reference to FIG. 6, for processing current video frame 603 (e.g., at enhancement 610), the coding parameter(s) (e.g., quantization parameter), may be determined based on input video 111 prior to current video frame 603 such as input video 111 up to and including video frame 602. Similarly, the global noise level may be determined based on pre-processed video 114 prior to current video frame 603 such as pre-processed video 114 up to and including enhanced video frame 612. In addition or in the alternative, the global noise level may be determined based on input video 111 prior to current video frame 603 such as input video 111 up to and including video frame 602. Furthermore, the application parameter(s) (e.g., the visual index) may be received for application to all of input video 111 such that the application parameter(s) may be characterized as overarching parameters or the like.

Returning to FIG. 4, processing may continue at operation 402, where variance(s) and/or pixel neighborhood for spatial filtering may be determined. The variance(s) and/or pixel neighborhood for spatial filtering may be determined using any suitable technique or techniques. In an embodiment, the variance(s) may be determined as discussed with respect to Equations (5) such that determining the variances includes applying a monotonic increasing function based on the coding parameter(s), a global noise level, and application parameter(s). For example, the variance or variances may be a monotonic increasing function of a quantization parameter, a global noise level, and a visual index corresponding to the current pixel value being processed. In an embodiment, the pixel neighborhood for spatial filtering may be a preset (e.g., non-adaptive) pixel neighborhood. In an embodiment, the pixel neighborhood for spatial filtering may also be a adaptive based on the quantization parameter, the global noise level, and the visual index. For example, the size of the pixel neighborhood may be a monotonic increasing function based on the quantization parameter the global noise level, and the visual index.

Processing may continue at operation 403, where the current pixel may be spatial-only filtered based on the pixel neighborhood and variance(s) determined at operation 402. The spatial-only filtering may be performed using any suitable technique or techniques. In an embodiment, the spatial-only filtering may be a convolution of a neighborhood of pixel values centered around and including the individual pixel value and a two-dimensional filter function having the variance determined at operation 402. In an embodiment, the spatial-only filtering may be convolution of an N×N neighborhood of pixels centered around and including the individual pixel and a two-dimensional Gaussian filter function having the variance determined at operation 402. For example, the spatial-only filtering may be applied as discussed with respect to Equation (2).

With reference to FIG. 3, in an embodiment, operation 303 may include determining at least one coding parameter corresponding to the individual pixel of the individual video frame, determining a global noise level corresponding to the individual pixel of the individual video frame, and receiving at least one application parameter corresponding to the individual pixel of the individual video frame such that the blending of spatial and temporal filtering applied at operation 304 is responsive to one or more of the coding parameter, the global noise level, and the application parameter.

Figure 5:
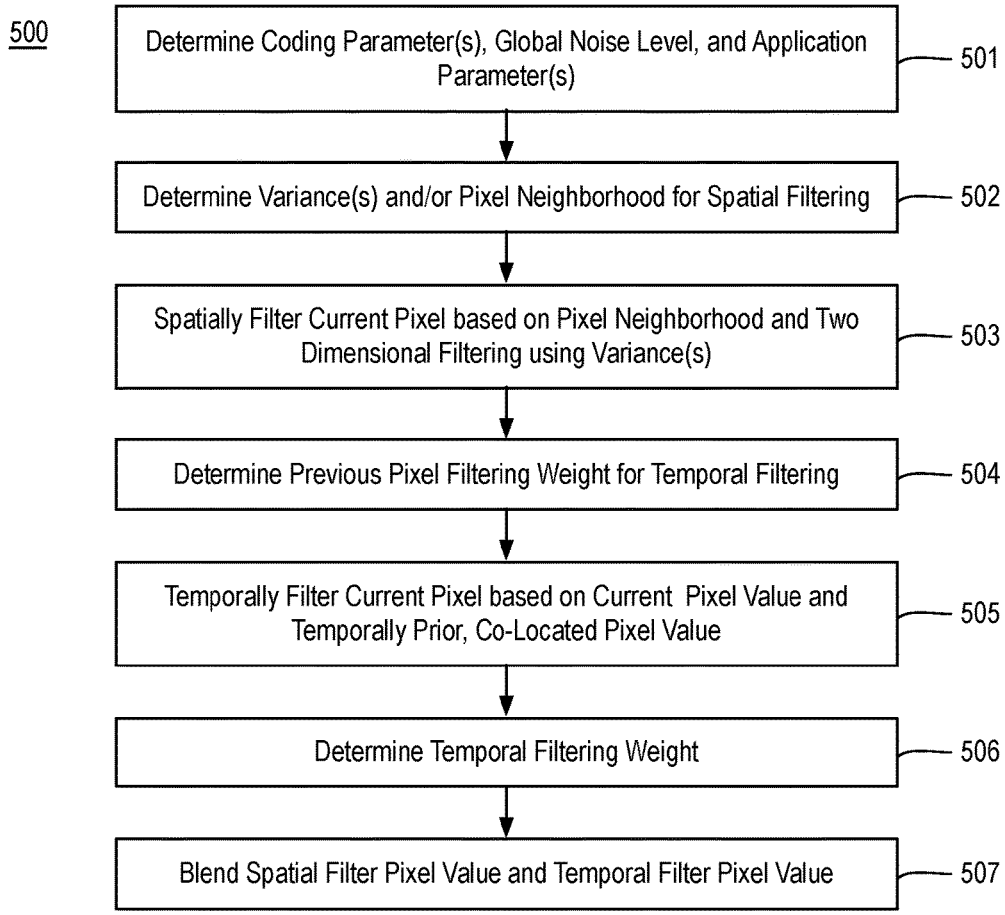
FIG. 5 is a flow diagram illustrating an example process for blending spatial and temporal filtering for pixel values of a current video frame.

FIG. 5 is a flow diagram illustrating an example process 500 for blending spatial and temporal filtering for pixel values of a current video frame, arranged in accordance with at least some implementations of the present disclosure. For example, process 500 may be performed at operation 303 of process 300. Process 500 may include one or more operations 501-507 as illustrated in FIG. 5. Process 500 may be performed by a device (e.g., system 100 or any other system or device discussed herein) to enhance a video frame, input video, video input data, or the like. Process 500 may be repeated for any number of pixels, pixel values, or the like.

Process 500 may begin at operation 501, where coding parameter(s), a global noise level, and application parameter(s) may be determined for a pixel value. As discussed with respect to operation 401, the coding parameter(s), global noise level, and application parameter(s) may be determined using any suitable technique or techniques and such parameters may be determined, for a pixel, at a pixel level, at a block level, at a frame level, or at a video sequence level. In an embodiment, the coding parameter(s) include a quantization parameter as discussed herein. In an embodiment, the application parameter(s) include a visual index as discussed herein. Furthermore, the parameters determined at operation 501 may be determined based on a video frame or frames temporally prior to the current video frame being enhanced or without need of the current video frame being enhanced as discussed with respect to operation 401 and FIG. 6.

Processing may continue at operation 502, where variance(s) and/or pixel neighborhood for spatial filtering may be determined. The variance(s) and/or pixel neighborhood for spatial filtering may be determined using any suitable technique or techniques. In an embodiment, the variance(s) may be determined as discussed with respect to Equations (5) such that determining the variances includes applying a monotonic increasing function based on the coding parameter(s), a global noise level, and application parameter(s). For example, the variance or variances may be a monotonic increasing function of a quantization parameter, a global noise level, and a visual index corresponding to the current pixel value being processed. In an embodiment, the pixel neighborhood for spatial filtering may be a preset (e.g., non-adaptive) pixel neighborhood. In an embodiment, the pixel neighborhood for spatial filtering may also be a adaptive based on the quantization parameter, the global noise level, and the visual index. For example, the size of the pixel neighborhood may be a monotonic increasing function based on the quantization parameter the global noise level, and the visual index.

Processing may continue at operation 503, where the current pixel may be spatially filtered based on the pixel neighborhood and variance(s) determined at operation 502 to generate a spatial filtering output value. The spatial filtering may be performed using any suitable technique or techniques discussed with respect to operation 403. In an embodiment, the spatial filtering is a convolution of a neighborhood of pixel values centered around and including the individual pixel value and a two-dimensional filter function having the variance determined at operation 402. For example, the spatial-only filtering may be applied as discussed with respect to Equation (2).

Processing may continue at operation 504, where a previous pixel filtering weight may be determined for the pixel being processed. The previous pixel filtering weight may be determined using any suitable technique or techniques. In an embodiment, the previous pixel filtering weight may be determined as discussed with respect to Equations (5) such that determining the previous pixel filtering weight includes applying a monotonic increasing function based on the coding parameter(s), a global noise level, and application parameter(s). For example, the previous pixel filtering weight may be a monotonic increasing function of a quantization parameter, a global noise level, and a visual index corresponding to the current pixel value being processed.

Processing may continue at operation 505, where the current pixel may be temporally filtered based on the previous pixel filtering weight determined at operation 504 and a temporally prior, co-located pixel value corresponding to the pixel value being processed to generate a temporal filtering output value. The temporal filtering may be performed using any suitable technique or techniques. In an embodiment, the temporal filtering may include determining a previous pixel value from another video frame co-located with the pixel value being processed and generating a weighted average of the previous pixel value and the pixel value being processed based on the previous pixel filtering weight. In an embodiment, the temporal filtering output value may be determined as discussed with respect to Equation (3). Furthermore, as discussed, the temporally prior, co-located pixel value (e.g., the previous pixel value) may be from any temporally prior frame. With reference to FIG. 6, video frame 603 may include a current pixel value that is being processed (e.g., $p_{in}(x,y,t)$) and the previous pixel value (e.g., $p_{out}(x,y,t-1)$) may be a co-located pixel value from enhanced video frame 612 of pre-processed video 114 (e.g., for out-of-loop pre-filtering) or from reconstructed video frame 622 of reconstructed video 620 (e.g., for in-loop pre-filtering).

Returning to FIG. 5, processing may continue at operation 506, where a temporal filtering weight may be determined for the pixel being processed. The temporal filtering weight may be determined using any suitable technique or techniques. In an embodiment, the temporal filtering weight may be determined as discussed with respect to Equations (5) such that determining the temporal filtering weight includes applying a monotonic increasing function based on the coding parameter(s), a global noise level, and application parameter(s). For example, the previous pixel filtering weight may be a monotonic increasing function of a quantization parameter, a global noise level, and a visual index corresponding to the current pixel value being processed.

Processing may continue at operation 507, where the spatial filtering output value and the temporal filtering output value may be blended based on the temporal filtering weight determined at operation 506 to generate an output pixel value for the pixel being processed. The blending of the spatial filtering output value and the temporal filtering output value may be performed using any suitable technique or techniques. In an embodiment, blending may be a weighted average of the spatial filtering output value and the temporal filtering output value weighted based on the temporal filtering weight. In an embodiment, the blending of the spatial filtering output value and the temporal filtering output value may be performed as discussed with respect to Equation (1).

Using the techniques discussed with respect to processes 400 and 500 implemented as discussed via operations 304 and 303, respectively, pixel values of a current video frame may be filtered or enhanced to generate a pre-processed, enhanced, or filtered video frame ready for encoding. As discussed with respect to FIG. 1, such pre-processed, enhanced, or filtered video frames may be encoded to generate a bitstream such as a standards compliant bitstream. Furthermore, as discussed with respect to FIG. 1, codec 104 may perform video encoding via a video encoder implemented by controller 105 and video coding engine 106.

FIG. 7 illustrates a block diagram of an example encoder 700, arranged in accordance with at least some implementations of the present disclosure. As shown, encoder 700 may include a motion estimation (ME) module 701, a motion compensation (MC) module 702, an intra mode selection (IMS) module 703, an intra prediction (IP) module 704, a frame reconstruction (FR) module 705, a deblock filtering (DF) module 706, a differencer 707, a selection switch 708, an adder 709, a transform (T) module 710, a quantization (Q) module 711, an inverse quantization (IQ) module 712, an inverse transform (IT) module 713, and an entropy encoder (EE) module 714. Encoder 700 may include additional modules and/or interconnections that are not shown for the sake of clarity of presentation.

As shown, encoder 700 may receive pre-processed video (PPV) 114 and encoder 700 may generate bitstream (B) 118 as discussed herein. For example, encoder 700 may divide a frame of pre-processed video 114 into blocks of different sizes, which may be predicted either temporally (inter) via motion estimation module 701 and motion compensation module 702 or spatially (intra) via intra mode selection module 703 and intra prediction module 704. Such a coding decision may be implemented via selection switch 708. Furthermore, based on the of intra or inter coding, a difference between source pixels and predicted pixels may be made via differencer 707. The difference may converted to the frequency domain (e.g., based on a discrete cosine transform) via transform module 710 and converted to quantized coefficients via quantization module 711. Such quantized coefficients along with various control signals may be entropy encoded via entropy encoder module 714 to generate encoded bitstream 721, which may be transmitted or transferred or the like to a decoder. Furthermore, the quantized coefficients may be inverse quantized via inverse quantization module 712 and inverse transformed via inverse transform module 713 to generate reconstructed differences or residuals. The reconstructed differences or residuals may be combined with reference blocks via adder 709 to generate reconstructed blocks, which, as shown, may be provided to intra mode selection module 703 and intra prediction module 704 for use in intra prediction. Furthermore, the reconstructed differences or residuals may be deblocked via deblock filtering module 706 and reconstructed via frame reconstruction module 705 to generate reconstructed frames, which may be stored in a picture buffer (not shown) and provided to motion estimation module 701 and motion compensation module 702 for use in inter prediction. Furthermore, as discussed, the reconstructed frames may be provided as reconstructed video (RV) 620 for use in temporal filtering as discussed herein. For example, reconstructed video 620 may be generated by a local decode loop of encoder 700 such that the local decode loop may include inverse quantization module 712, inverse transform module 713, adder 709, deblock filtering module 706, motion compensation module 702, and intra prediction module 704.

The discussed systems and video pre-processing may provide for improved coding efficiency and/or improved subjective video quality.

Figure 8:
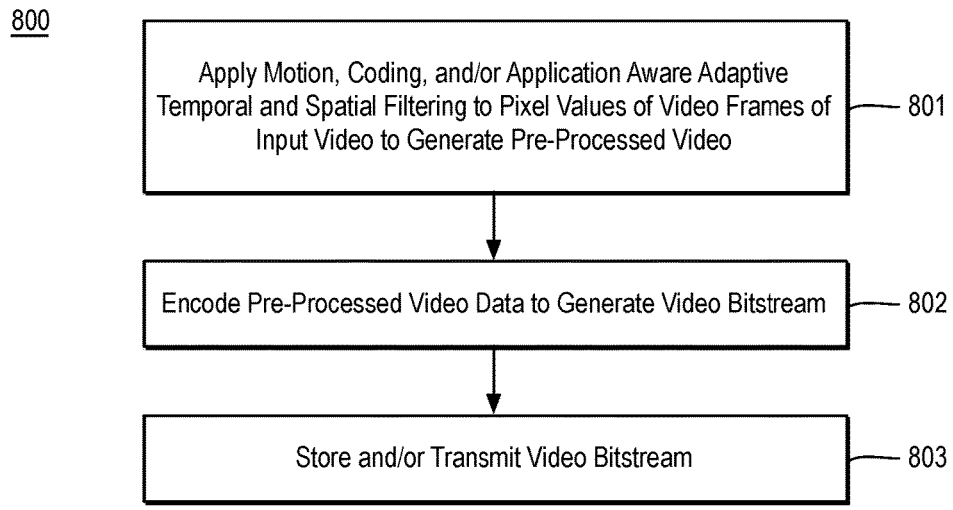
FIG. 8 is a flow diagram illustrating an example process for video pre-processing and video coding.

FIG. 8 is a flow diagram illustrating an example process 800 for video pre-processing and video coding, arranged in accordance with at least some implementations of the present disclosure. Process 800 may include one or more operations 801-803 as illustrated in FIG. 8. Process 800 may form at least part of a video encoding process. By way of non-limiting example, process 800 may form at least part of a video encoding process for video as undertaken by system 100 as discussed herein. Furthermore, process 800 will be described herein in reference to system 900 of FIG. 9.

Figure 9:
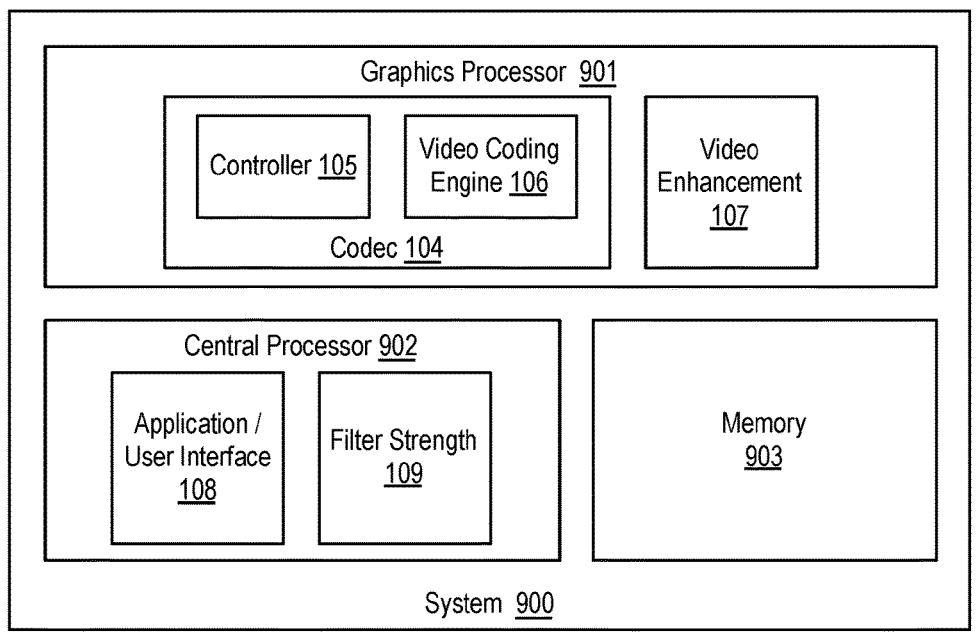
FIG. 9 is an illustrative diagram of an example system for video pre-processing and video coding.

FIG. 9 is an illustrative diagram of an example system 900 for video pre-processing and video coding, arranged in accordance with at least some implementations of the present disclosure. As shown in FIG. 9, system 900 may include a graphics processor 901, a central processor 902, and a memory 903. Also as shown, graphics processor 901 may include codec 104, which may include controller 105 and video coding engine 106, and video enhancement module 107. Furthermore, central processor 902 may include application and/or user interface 108 and filter strength module 109. In the example of system 900, memory 903 may store video content such as video frames or a bitstream or any other data or parameters discussed herein.

Graphics processor 901 may include any number and type of graphics processors or processing units that may provide the operations as discussed herein. Such operations may be implemented via software or hardware or a combination thereof. In an embodiment, the illustrated modules of graphics processor 901 may be implemented via circuitry or the like. For example, graphics processor 901 may include circuitry dedicated to manipulate video data to generate compressed image data. Central processor 902 may include any number and type of processing units or modules that may provide control and other high level functions for system 900 and/or provide the operations discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In an embodiment, memory 903 may be configured to store video data such as pixel values, control parameters, bitstream data, or any other video data discussed herein. In a non-limiting example, memory 903 may be implemented by cache memory. In an embodiment, codec 104 and/or video enhancement module 107 may be implemented via execution units (EU) of graphics processor 901. The execution units may include, for example, programmable logic or circuitry such as a logic core or cores that may provide a wide array of programmable logic functions. In an embodiment, codec 104 and/or video enhancement module 107 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 may begin at operation 801, where motion, coding, and/or application aware adaptive temporal and spatial filtering may be applied to pixel values of video frames of input video data to generate pre-processed video data. The motion, coding, and/or application aware adaptive temporal and spatial filtering may be applied to pixel values of video frames of input video data to generate pre-processed video data using any suitable technique or techniques. In an embodiment, video enhancement module 107 as implemented via graphics processor 901 may apply motion, coding, and/or application aware adaptive temporal and spatial filtering may be applied to pixel values of video frames of input video data to generate pre-processed video data. In an embodiment, the adaptive temporal and spatial filtering includes, for an individual pixel value of a block of pixels of an individual video frame of the input video, blending spatial and temporal filtering of the individual pixel value when the block of pixels is a non-motion block and spatial-only filtering the individual pixel value when the block of pixels is a motion block.

In an embodiment, process 800 may further include determining at least one coding parameter corresponding to the individual pixel of the individual video frame, determining a global noise level corresponding to the individual pixel of the individual video frame, and receiving at least one application parameter corresponding to the individual pixel of the individual video frame such that the blending of spatial and temporal filtering and the spatial-only filtering are responsive to the coding parameter, the global noise level, and the application parameter.

In an embodiment, spatial-only filtering the individual pixel value (e.g., when the pixel is a motion pixel) includes a convolution of a neighborhood of pixel values centered around and including the individual pixel value and a two-dimensional filter function having a variance based on a quantization parameter, a global noise level, and a visual index corresponding to the individual pixel of the individual video frame. For example, the variance may be a monotonic increasing function of the quantization parameter, the global noise level, and the visual index. In an embodiment, blending spatial and temporal filtering of the individual pixel value includes determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value. For example, the temporal filtering weight may be a monotonic increasing function of a quantization parameter, a global noise level, and a visual index corresponding to the individual pixel of the individual video frame such that the visual index comprises a low value for a low visual loss and a higher value for greater visual loss. Furthermore, determining the spatial filtering output value may include a convolution of an N×N neighborhood of pixels centered around and including the individual pixel and a two-dimensional Gaussian filter function having a variance based on a quantization parameter, a global noise level, and a visual index corresponding to the individual pixel of the individual video frame such that the visual index has a low value for low smoothing and a higher value for greater smoothing and such that the variance comprises a monotonic increasing function of the quantization parameter, the global noise level, and the visual index.

In an embodiment, determining the temporal filtering output value includes determining a previous pixel filtering weight for the individual pixel value, determining a previous pixel value from a second video frame, wherein the previous pixel value is co-located with the individual pixel value, and generating a weighted average of the previous pixel value and the individual pixel value based on the previous pixel filtering weight. For example, the previous pixel filtering weight comprises a monotonic increasing function of a quantization parameter, a global noise level, and a visual index corresponding to the individual pixel. In an embodiment, the second video frame is a temporally prior adaptive temporal and spatial filtered video frame with respect to the individual video frame. In another embodiment, encoding the pre-processed video stream includes reconstructing the second video frame in a local decode loop of the encoding and the second video frame is temporally prior to the individual video frame.

In an embodiment, process 800 further includes determining a coding parameter for the individual pixel value based on a second video frame of the input video such that the second video frame is temporally prior to the individual video frame. For example, encoding the pre-processed video stream may include encoding a third adaptive temporal and spatial filtered video frame temporally subsequent to the individual video frame and encoding the third adaptive temporal and spatial filtered video frame and applying adaptive temporal and spatial filtering to the individual video frame may be performed in parallel.

Processing may continue at operation 802, where the pre-processed video may be encoded to generate a video bitstream. The pre-processed video may be encoded to generate the video bitstream using any suitable technique or techniques. For example, the pre-processed video may be coded based on any of an H.264/MPEG-4 advanced video coding (AVC) standards based codec, a high efficiency video coding (H.265/HEVC) standards based codec, an Alliance for Open Media (AOM) standards based codec such as the AV1 standard, an MPEG standards based codec such as the MPEG-4 standard, a VP9 standards based codec, or any other suitable codec or extension or profile thereof. In an embodiment, the pre-processed video may be encoded by codec 104 as implemented via graphics processor 901.

Processing may continue at operation 803, where the video bitstream may be stored and/or transmitted. The video bitstream may be stored and/or transmitted using any suitable technique or techniques. For example, the video bitstream may be stored by graphics processor 901 to memory 903. In addition or in the alternative, the video bitstream may be transmitted communications circuitry and/or an antenna of system 900 (not shown).

Various components of the systems described herein may be implemented in software, firmware, and/or hardware and/or any combination thereof. For example, various components of system 100 or system 900 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement the techniques, modules, components, or the like as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
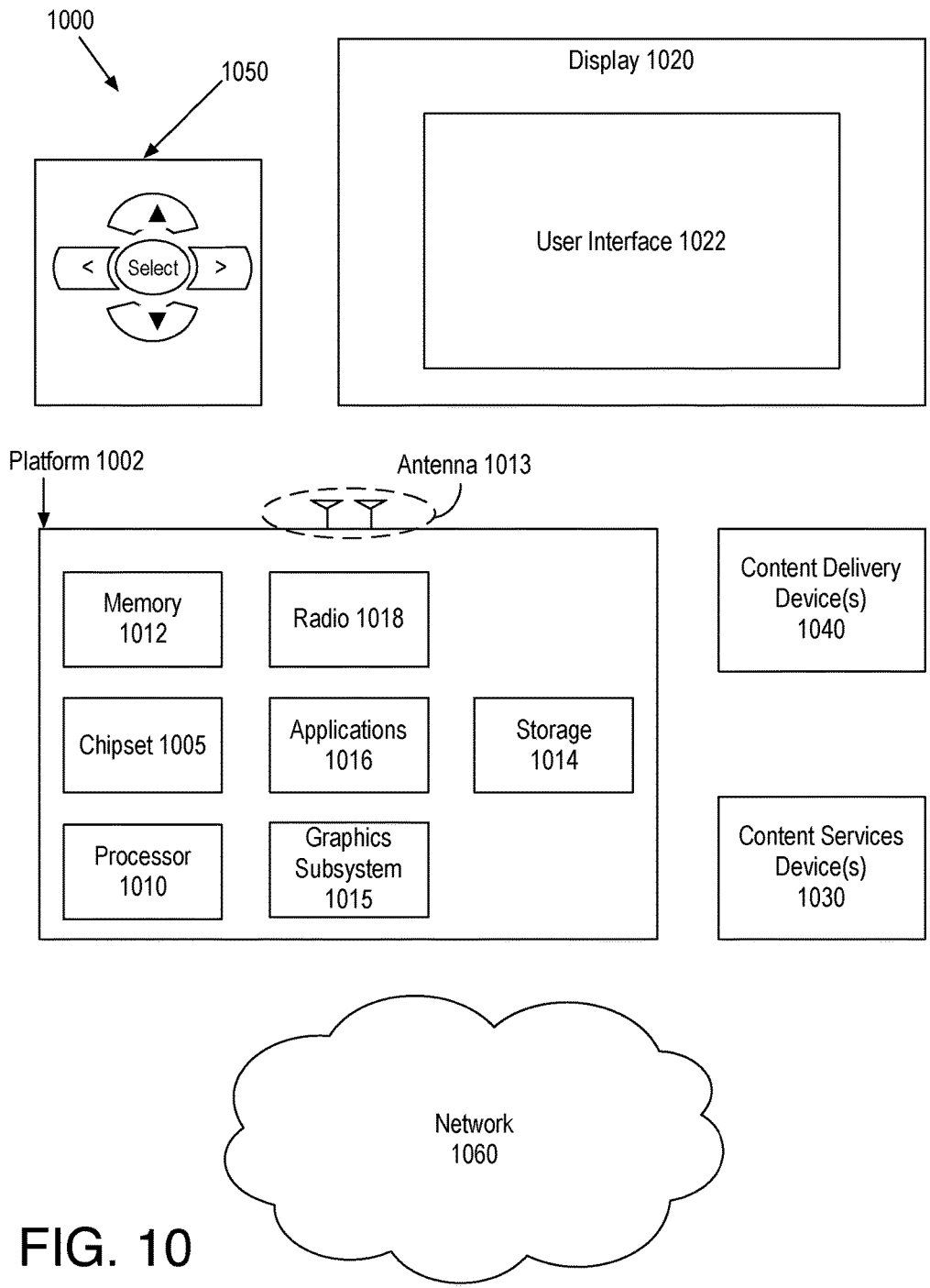
FIG. 10 is an illustrative diagram of an example system.

FIG. 10 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
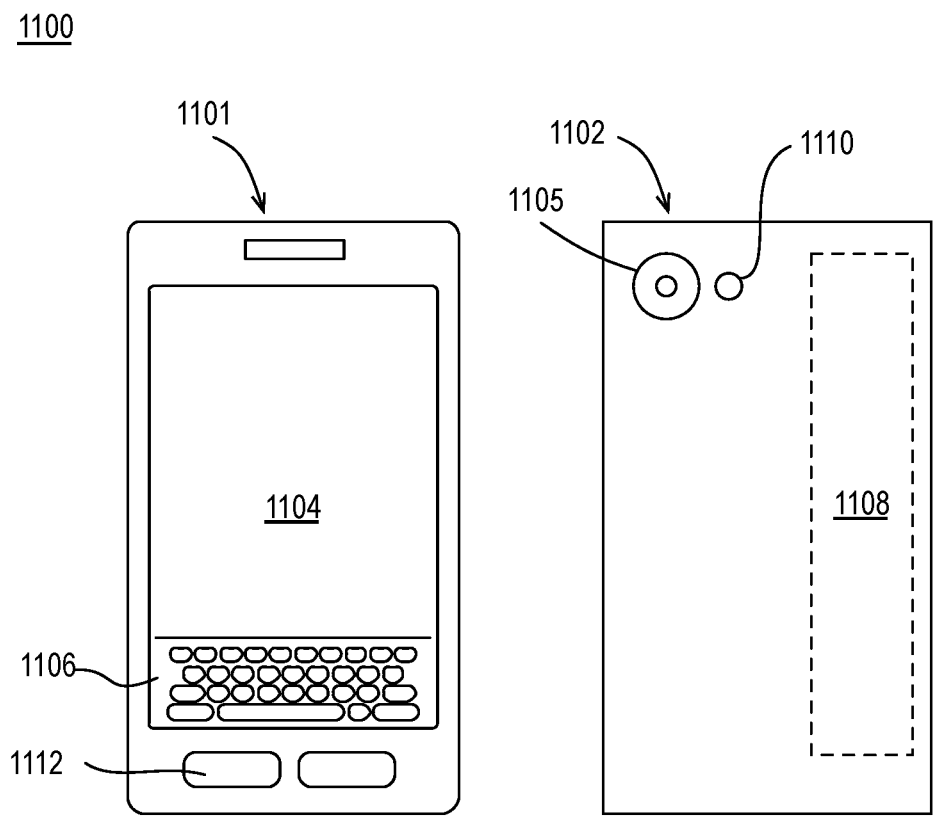
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, system 1500 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for video coding comprises applying adaptive temporal and spatial filtering to pixel values of video frames of input video to generate pre-processed video such that the adaptive temporal and spatial filtering comprises, for an individual pixel value of a block of pixels of an individual video frame of the input video blending spatial and temporal filtering of the individual pixel value when the block of pixels is a non-motion block and spatial-only filtering the individual pixel value when the block of pixels is a motion block, encoding the pre-processed video to generate a video bitstream, and storing the video bitstream.

Further to the first embodiments, the method further comprises determining at least one coding parameter corresponding to the individual pixel of the individual video frame, determining a global noise level corresponding to the individual pixel of the individual video frame, and receiving at least one application parameter corresponding to the individual pixel of the individual video frame such that the blending of spatial and temporal filtering and the spatial-only filtering are responsive to the coding parameter, the global noise level, and the application parameter.

Further to the first embodiments, spatial-only filtering the individual pixel value comprises a convolution of a neighborhood of pixel values centered around and including the individual pixel value and a two-dimensional filter function having a variance based on a quantization parameter, a global noise level, and a visual index corresponding to the individual pixel of the individual video frame.

Further to the first embodiments, spatial-only filtering the individual pixel value comprises a convolution of a neighborhood of pixel values centered around and including the individual pixel value and a two-dimensional filter function having a variance based on a quantization parameter, a global noise level, and a visual index corresponding to the individual pixel of the individual video frame such that the variance comprises a monotonic increasing function of the quantization parameter, the global noise level, and the visual index.

Further to the first embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value.

Further to the first embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value such that the temporal filtering weight comprises a monotonic increasing function of a quantization parameter, a global noise level, and a visual index corresponding to the individual pixel of the individual video frame and such that the visual index comprises a low value for a low visual loss and a higher value for greater visual loss.

Further to the first embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value such that determining the spatial filtering output value comprises a convolution of an N×N neighborhood of pixels centered around and including the individual pixel and a two-dimensional Gaussian filter function having a variance based on a quantization parameter, a global noise level, and a visual index corresponding to the individual pixel of the individual video frame, the visual index has a low value for low smoothing and a higher value for greater smoothing, and the variance comprises a monotonic increasing function of the quantization parameter, the global noise level, and the visual index.

Further to the first embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value such that determining the temporal filtering output value comprises determining a previous pixel filtering weight for the individual pixel value, determining a previous pixel value from a second video frame, wherein the previous pixel value is co-located with the individual pixel value, and generating a weighted average of the previous pixel value and the individual pixel value based on the previous pixel filtering weight.

Further to the first embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value such that determining the temporal filtering output value comprises determining a previous pixel filtering weight for the individual pixel value, determining a previous pixel value from a second video frame, wherein the previous pixel value is co-located with the individual pixel value, and generating a weighted average of the previous pixel value and the individual pixel value based on the previous pixel filtering weight such that the previous pixel filtering weight comprises a monotonic increasing function of a quantization parameter, a global noise level, and a visual index corresponding to the individual pixel.

Further to the first embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value such that determining the temporal filtering output value comprises determining a previous pixel filtering weight for the individual pixel value, determining a previous pixel value from a second video frame, wherein the previous pixel value is co-located with the individual pixel value, and generating a weighted average of the previous pixel value and the individual pixel value based on the previous pixel filtering weight such that the second video frame comprises a temporally prior adaptive temporal and spatial filtered video frame with respect to the individual video frame.

Further to the first embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value such that determining the temporal filtering output value comprises determining a previous pixel filtering weight for the individual pixel value, determining a previous pixel value from a second video frame, wherein the previous pixel value is co-located with the individual pixel value, and generating a weighted average of the previous pixel value and the individual pixel value based on the previous pixel filtering weight such that encoding the pre-processed video stream comprises reconstructing the second video frame in a local decode loop of the encoding and wherein the second video frame is temporally prior to the individual video frame.

Further to the first embodiments, the method further comprises determining a coding parameter for the individual pixel value based on a second video frame of the input video, wherein the second video frame is temporally prior to the individual video frame such that encoding the pre-processed video stream comprises encoding a third adaptive temporal and spatial filtered video frame temporally subsequent to the individual video frame and encoding the third adaptive temporal and spatial filtered video frame and applying adaptive temporal and spatial filtering to the individual video frame are performed in parallel.

In one or more second embodiments, a system for video coding comprises a memory to store input video and a graphics processor coupled to the memory, the graphics processor to apply adaptive temporal and spatial filtering to pixel values of video frames of input video to generate pre-processed video, such that the adaptive temporal and spatial filtering comprises, for an individual pixel value of a block of pixels of an individual video frame of the input video, the graphics processor to blend spatial and temporal filtering of the individual pixel value when the block of pixels is a non-motion block and to spatial-only filter the individual pixel value when the block of pixels is a motion block, to encode the pre-processed video to generate a video bitstream, and to store the video bitstream.

Further to the second embodiments, the graphics processor is further to determine at least one coding parameter corresponding to the individual pixel of the individual video frame, to determine a global noise level corresponding to the individual pixel of the individual video frame, and to receive at least one application parameter corresponding to the individual pixel of the individual video frame, such that the blending of spatial and temporal filtering and the spatial-only filtering are responsive to the coding parameter, the global noise level, and the application parameter.

Further to the second embodiments, to spatial-only filter the individual pixel value comprises the graphics processor to determine a convolution of a neighborhood of pixel values centered around and including the individual pixel value and a two-dimensional filter function having a variance based on a quantization parameter, a global noise level, and a visual index corresponding to the individual pixel of the individual video frame.

Further to the second embodiments, to spatial-only filter the individual pixel value comprises the graphics processor to determine a convolution of a neighborhood of pixel values centered around and including the individual pixel value and a two-dimensional filter function having a variance based on a quantization parameter, a global noise level, and a visual index corresponding to the individual pixel of the individual video frame such that the variance comprises a monotonic increasing function of the quantization parameter, the global noise level, and the visual index.

Further to the second embodiments, to blend spatial and temporal filtering of the individual pixel value comprises the graphics processor to determine a spatial filtering output value and a temporal filtering output value for the individual pixel value, to determine a temporal filtering weight for the individual pixel value, and to generate a weighted average of the spatial filtering output value and the temporal filtering output value based on the temporal filtering weight for the individual pixel value.

Further to the second embodiments, to blend spatial and temporal filtering of the individual pixel value comprises the graphics processor to determine a spatial filtering output value and a temporal filtering output value for the individual pixel value, to determine a temporal filtering weight for the individual pixel value, and to generate a weighted average of the spatial filtering output value and the temporal filtering output value based on the temporal filtering weight for the individual pixel value such that the temporal filtering weight comprises a monotonic increasing function of a quantization parameter, a global noise level, and a visual index corresponding to the individual pixel of the individual video frame and the visual index comprises a low value for a low visual loss and a higher value for greater visual loss.

Further to the second embodiments, to blend spatial and temporal filtering of the individual pixel value comprises the graphics processor to determine a spatial filtering output value and a temporal filtering output value for the individual pixel value, to determine a temporal filtering weight for the individual pixel value, and to generate a weighted average of the spatial filtering output value and the temporal filtering output value based on the temporal filtering weight for the individual pixel value such that to determine the spatial filtering output value comprises the graphics processor to determine a convolution of an N×N neighborhood of pixels centered around and including the individual pixel and a two-dimensional Gaussian filter function having a variance based on a quantization parameter, a global noise level, and a visual index corresponding to the individual pixel of the individual video frame, the visual index has a low value for low smoothing and a higher value for greater smoothing, and the variance comprises a monotonic increasing function of the quantization parameter, the global noise level, and the visual index.

Further to the second embodiments, to blend spatial and temporal filtering of the individual pixel value comprises the graphics processor to determine a spatial filtering output value and a temporal filtering output value for the individual pixel value, to determine a temporal filtering weight for the individual pixel value, and to generate a weighted average of the spatial filtering output value and the temporal filtering output value based on the temporal filtering weight for the individual pixel value such that to determine the temporal filtering output value comprises the graphics processor to determine a previous pixel filtering weight for the individual pixel value, to determine a previous pixel value from a second video frame, such that the previous pixel value is co-located with the individual pixel value, and to generate a weighted average of the previous pixel value and the individual pixel value based on the previous pixel filtering weight, such that the previous pixel filtering weight comprises a monotonic increasing function of a quantization parameter, a global noise level, and a visual index corresponding to the individual pixel.

Further to the second embodiments, to blend spatial and temporal filtering of the individual pixel value comprises the graphics processor to determine a spatial filtering output value and a temporal filtering output value for the individual pixel value, to determine a temporal filtering weight for the individual pixel value, and to generate a weighted average of the spatial filtering output value and the temporal filtering output value based on the temporal filtering weight for the individual pixel value such that to determine the temporal filtering output value comprises the graphics processor to determine a previous pixel filtering weight for the individual pixel value, to determine a previous pixel value from a second video frame, such that the previous pixel value is co-located with the individual pixel value, and to generate a weighted average of the previous pixel value and the individual pixel value based on the previous pixel filtering weight, such that the previous pixel filtering weight comprises a monotonic increasing function of a quantization parameter, a global noise level, and a visual index corresponding to the individual pixel such that the second video frame comprises a temporally prior adaptive temporal and spatial filtered video frame with respect to the individual video frame.

Further to the second embodiments, to blend spatial and temporal filtering of the individual pixel value comprises the graphics processor to determine a spatial filtering output value and a temporal filtering output value for the individual pixel value, to determine a temporal filtering weight for the individual pixel value, and to generate a weighted average of the spatial filtering output value and the temporal filtering output value based on the temporal filtering weight for the individual pixel value such that to determine the temporal filtering output value comprises the graphics processor to determine a previous pixel filtering weight for the individual pixel value, to determine a previous pixel value from a second video frame, such that the previous pixel value is co-located with the individual pixel value, and to generate a weighted average of the previous pixel value and the individual pixel value based on the previous pixel filtering weight, such that the previous pixel filtering weight comprises a monotonic increasing function of a quantization parameter, a global noise level, and a visual index corresponding to the individual pixel such that to encode the pre-processed video stream comprises the graphics processor to reconstruct the second video frame in a local decode loop of the encode and wherein the second video frame is temporally prior to the individual video frame.

Further to the second embodiments, the graphics processor is further to determine a coding parameter for the individual pixel value based on a second video frame of the input video, such that the second video frame is temporally prior to the individual video frame, encoding the pre-processed video stream comprises encoding a third adaptive temporal and spatial filtered video frame temporally subsequent to the individual video frame, and encoding the third adaptive temporal and spatial filtered video frame and applying adaptive temporal and spatial filtering to the individual video frame are performed in parallel.

In one or more third embodiments, a system comprises means for applying adaptive temporal and spatial filtering to pixel values of video frames of input video to generate pre-processed video, wherein the adaptive temporal and spatial filtering comprises, for an individual pixel value of a block of pixels of an individual video frame of the input video blending spatial and temporal filtering of the individual pixel value when the block of pixels is a non-motion block and spatial-only filtering the individual pixel value when the block of pixels is a motion block, means for encoding the pre-processed video to generate a video bitstream, and means for storing the video bitstream.

Further to the third embodiments, spatial-only filtering the individual pixel value comprises a convolution of a neighborhood of pixel values centered around and including the individual pixel value and a two-dimensional filter function having a variance based on a quantization parameter, a global noise level, and a visual index corresponding to the individual pixel of the individual video frame, such that the variance comprises a monotonic increasing function of the quantization parameter, the global noise level, and the visual index.

Further to the third embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value, such that the temporal filtering weight comprises a monotonic increasing function of a quantization parameter, a global noise level, and a visual index corresponding to the individual pixel of the individual video frame, the visual index comprises a low value for a low visual loss and a higher value for greater visual loss.

Further to the third embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value, such that the temporal filtering weight comprises a monotonic increasing function of a quantization parameter, a global noise level, and a visual index corresponding to the individual pixel of the individual video frame, the visual index comprises a low value for a low visual loss and a higher value for greater visual loss such that determining the temporal filtering output value comprises determining a previous pixel filtering weight for the individual pixel value, determining a previous pixel value from a second video frame, wherein the previous pixel value is co-located with the individual pixel value, and generating a weighted average of the previous pixel value and the individual pixel value based on the previous pixel filtering weight, such that the previous pixel filtering weight comprises a monotonic increasing function of a quantization parameter, a global noise level, and a visual index corresponding to the individual pixel.

Further to the third embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value, such that the temporal filtering weight comprises a monotonic increasing function of a quantization parameter, a global noise level, and a visual index corresponding to the individual pixel of the individual video frame, the visual index comprises a low value for a low visual loss and a higher value for greater visual loss such that determining the temporal filtering output value comprises determining a previous pixel filtering weight for the individual pixel value, determining a previous pixel value from a second video frame, wherein the previous pixel value is co-located with the individual pixel value, and generating a weighted average of the previous pixel value and the individual pixel value based on the previous pixel filtering weight, such that the previous pixel filtering weight comprises a monotonic increasing function of a quantization parameter, a global noise level, and a visual index corresponding to the individual pixel and such that the second video frame comprises a temporally prior adaptive temporal and spatial filtered video frame with respect to the individual video frame.

Further to the third embodiments, the system further comprises means for determining a coding parameter for the individual pixel value based on a second video frame of the input video, wherein the second video frame is temporally prior to the individual video frame such that the means for encoding the pre-processed video stream comprise means for encoding a third adaptive temporal and spatial filtered video frame temporally subsequent to the individual video frame and the means for encoding the third adaptive temporal and spatial filtered video frame and the means for applying adaptive temporal and spatial filtering to the individual video frame comprise means for performing the encoding and applying in parallel.

In one or more fourth embodiments, at least one machine readable medium comprises a plurality of instructions that, in response to being executed on a computing device, cause the computing device to perform video coding by applying adaptive temporal and spatial filtering to pixel values of video frames of input video to generate pre-processed video such that the adaptive temporal and spatial filtering comprises, for an individual pixel value of a block of pixels of an individual video frame of the input video blending spatial and temporal filtering of the individual pixel value when the block of pixels is a non-motion block and spatial-only filtering the individual pixel value when the block of pixels is a motion block, encoding the pre-processed video to generate a video bitstream, and storing the video bitstream.

Further to the fourth embodiments, spatial-only filtering the individual pixel value comprises a convolution of a neighborhood of pixel values centered around and including the individual pixel value and a two-dimensional filter function having a variance based on a quantization parameter, a global noise level, and a visual index corresponding to the individual pixel of the individual video frame, such that the variance comprises a monotonic increasing function of the quantization parameter, the global noise level, and the visual index.

Further to the fourth embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value, such that the temporal filtering weight comprises a monotonic increasing function of a quantization parameter, a global noise level, and a visual index corresponding to the individual pixel of the individual video frame and such that the visual index comprises a low value for a low visual loss and a higher value for greater visual loss.

Further to the fourth embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value, such that the temporal filtering weight comprises a monotonic increasing function of a quantization parameter, a global noise level, and a visual index corresponding to the individual pixel of the individual video frame and such that the visual index comprises a low value for a low visual loss and a higher value for greater visual loss and such that determining the temporal filtering output value comprises determining a previous pixel filtering weight for the individual pixel value, determining a previous pixel value from a second video frame, such that the previous pixel value is co-located with the individual pixel value, and generating a weighted average of the previous pixel value and the individual pixel value based on the previous pixel filtering weight, such that the previous pixel filtering weight comprises a monotonic increasing function of a quantization parameter, a global noise level, and a visual index corresponding to the individual pixel.

Further to the fourth embodiments, blending spatial and temporal filtering of the individual pixel value comprises determining a spatial filtering output value and a temporal filtering output value for the individual pixel value, determining a temporal filtering weight for the individual pixel value, and generating a weighted average of the spatial filtering output value and the temporal filtering output value based on the temporal filtering weight for the individual pixel value, such that the temporal filtering weight comprises a monotonic increasing function of a quantization parameter, a global noise level, and a visual index corresponding to the individual pixel of the individual video frame and such that the visual index comprises a low value for a low visual loss and a higher value for greater visual loss and such that determining the temporal filtering output value comprises determining a previous pixel filtering weight for the individual pixel value, determining a previous pixel value from a second video frame, such that the previous pixel value is co-located with the individual pixel value, and generating a weighted average of the previous pixel value and the individual pixel value based on the previous pixel filtering weight, such that the previous pixel filtering weight comprises a monotonic increasing function of a quantization parameter, a global noise level, and a visual index corresponding to the individual pixel and such that the second video frame comprises a temporally prior adaptive temporal and spatial filtered video frame with respect to the individual video frame.

Further to the fourth embodiments, the at least one machine readable medium further comprises a plurality of instructions that, in response to being executed on the computing device, cause the computing device to perform video coding by determining a coding parameter for the individual pixel value based on a second video frame of the input video, wherein the second video frame is temporally prior to the individual video frame such that encoding the pre-processed video stream comprises encoding a third adaptive temporal and spatial filtered video frame temporally subsequent to the individual video frame and encoding the third adaptive temporal and spatial filtered video frame and applying adaptive temporal and spatial filtering to the individual video frame are performed in parallel.

In one or more fifth embodiments, at least one machine readable medium may include a plurality of instructions that in response to being executed on a computing device, causes the computing device to perform a method according to any one of the above embodiments.

In one or more sixth embodiments, an apparatus or system may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video coding comprising:
   applying adaptive temporal and spatial filtering to pixel values of video frames of input video to generate pre-processed video, wherein the adaptive temporal and spatial filtering comprises, for an individual pixel value of a block of pixels of an individual video frame of the input video:
      spatial-only filtering the individual pixel value when the block is a motion block; and
      blending spatial and temporal filtering of the individual pixel value when the block is a non-motion block by determining a spatial filtering output value and a temporal filtering output value for the individual pixel and generating a weighted average of the spatial and temporal filtering output values, wherein determining the temporal filtering output value comprises determining a previous pixel filtering weight for the individual pixel value and generating a weighted average of a previous pixel value from a second video frame and the individual pixel value based on the previous pixel filtering weight, wherein the previous pixel value is co-located with the individual pixel value, and wherein the previous pixel filtering weight is determined using a monotonic increasing function of a quantization parameter, a global noise level, and a visual index corresponding to the individual pixel;
   encoding the pre-processed video to generate a video bitstream; and
   storing the video bitstream.

2. The method of claim 1, further comprising:
   determining at least one coding parameter corresponding to the individual pixel of the individual video frame;
   determining the global noise level corresponding to the individual pixel of the individual video frame; and
   receiving at least one application parameter corresponding to the individual pixel of the individual video frame, wherein the blending of spatial and temporal filtering and the spatial-only filtering are responsive to the coding parameter, the global noise level, and the application parameter.

3. The method of claim 1, wherein spatial-only filtering the individual pixel value comprises a convolution of a neighborhood of pixel values centered around and including the individual pixel value and a two-dimensional filter function having a variance based on the quantization parameter, the global noise level, and the visual index corresponding to the individual pixel of the individual video frame.

4. The method of claim 3, wherein the variance comprises a second monotonic increasing function of the quantization parameter, the global noise level, and the visual index.

5. The method of claim 1, wherein the temporal filtering weight comprises a second monotonic increasing function of the quantization parameter, the global noise level, and the visual index, wherein the visual index comprises a low value for a low visual loss and a higher value for greater visual loss.

6. The method of claim 1, wherein determining the spatial filtering output value comprises a convolution of an N×N neighborhood of pixels centered around and including the individual pixel and a two-dimensional Gaussian filter function having a variance based on the quantization parameter, the global noise level, and the visual index, wherein the visual index has a low value for low smoothing and a higher value for greater smoothing, and wherein the variance comprises a second monotonic increasing function of the quantization parameter, the global noise level, and the visual index.

7. The method of claim 1, wherein the weighted average of the previous pixel value and the individual pixel value comprises a sum of the pixel filtering weight multiplied by the previous pixel value and one minus the previous pixel filtering weight multiplied by the individual pixel value.

8. The method of claim 1, wherein the second video frame comprises a temporally prior adaptive temporal and spatial filtered video frame with respect to the individual video frame.

9. The method of claim 1, wherein encoding the pre-processed video stream comprises reconstructing the second video frame in a local decode loop of the encoding and wherein the second video frame is temporally prior to the individual video frame.

10. The method of claim 1, further comprising:
    determining a coding parameter for the individual pixel value based on the second video frame of the input video, wherein the second video frame is temporally prior to the individual video frame,
    wherein encoding the pre-processed video stream comprises encoding a third adaptive temporal and spatial filtered video frame temporally subsequent to the individual video frame, and
    wherein encoding the third adaptive temporal and spatial filtered video frame and applying adaptive temporal and spatial filtering to the individual video frame are performed in parallel.

11. A system for video coding comprising:
    a memory to store input video; and
    a processor coupled to the memory, the processor to apply adaptive temporal and spatial filtering to pixel values of video frames of input video to generate pre-processed video, wherein the adaptive temporal and spatial filtering comprises, for an individual pixel value of a block of pixels of an individual video frame of the input video, the processor to:
    spatial-only filter the individual pixel value when the block is a motion block; and
    blend spatial and temporal filtering of the individual pixel value when the block of pixels is a non-motion block, wherein the processor to blend spatial and temporal filtering of the individual pixel value comprises the processor to determine a spatial filtering output value and a temporal filtering output value for the individual pixel and generate a weighted average of the spatial and temporal filtering output values, wherein the processor to determine the temporal filtering output value comprises the processor to determine a previous pixel filtering weight for the individual pixel value and generate a weighted average of a previous pixel value from a second video frame and the individual pixel value based on the previous pixel filtering weight, wherein the previous pixel value is co-located with the individual pixel value, and wherein the previous pixel filtering weight is determined using a monotonic increasing function of a quantization parameter, a global noise level, and a visual index corresponding to the individual pixel;

encode the pre-processed video to generate a video bitstream; and store the video bitstream.

12. The system of claim 11, wherein the processor to spatial-only filter the individual pixel value comprises the processor to determine a convolution of a neighborhood of pixel values centered around and including the individual pixel value and a two-dimensional filter function having a variance based on the quantization parameter, the global noise level, and the visual index, wherein the variance comprises a monotonic increasing function of the quantization parameter, the global noise level, and the visual index.

13. The system of claim 11, wherein the temporal filtering weight comprises a second monotonic increasing function of the quantization parameter, the global noise level, and the visual index corresponding to the individual pixel of the individual video frame, wherein the visual index comprises a low value for a low visual loss and a higher value for greater visual loss.

14. The system of claim 11, wherein the weighted average of the previous pixel value and the individual pixel value comprises a sum of the pixel filtering weight multiplied by the previous pixel value and one minus the previous pixel filtering weight multiplied by the individual pixel value.

15. The system of claim 14, wherein the second video frame comprises a temporally prior adaptive temporal and spatial filtered video frame with respect to the individual video frame.

16. The system of claim 11, wherein the processor is further to determine a coding parameter for the individual pixel value based on the second video frame of the input video, wherein the second video frame is temporally prior to the individual video frame, wherein the processor to encode the pre-processed video stream comprises the processor to encode a third adaptive temporal and spatial filtered video frame temporally subsequent to the individual video frame, and wherein the processor to encode the third adaptive temporal and spatial filtered video frame and the processor to apply adaptive temporal and spatial filtering to the individual video frame are performed in parallel.

17. The system of claim 11, wherein the processor to determine the spatial filtering output value comprises a convolution of an N×N neighborhood of pixels centered around and including the individual pixel and a two-dimensional Gaussian filter function having a variance based on the quantization parameter, the global noise level, and the visual index, wherein the visual index has a low value for low smoothing and a higher value for greater smoothing, and wherein the variance comprises a second monotonic increasing function of the quantization parameter, the global noise level, and the visual index.

18. At least one non-transitory machine readable medium comprising a plurality of instructions that, in response to being executed on a computing device, cause the computing device to perform video coding by:

applying adaptive temporal and spatial filtering to pixel values of video frames of input video to generate pre-processed video, wherein the adaptive temporal and spatial filtering comprises, for an individual pixel value of a block of pixels of an individual video frame of the input video:

spatial-only filtering the individual pixel value when the block is a motion block; and blending spatial and temporal filtering of the individual pixel value when the block is a non-motion block by determining a spatial filtering output value and a temporal filtering output value for the individual pixel and generating a weighted average of the spatial and temporal filtering output values, wherein determining the temporal filtering output value comprises determining a previous pixel filtering weight for the individual pixel value and generating a weighted average of a previous pixel value from a second video frame and the individual pixel value based on the previous pixel filtering weight, wherein the previous pixel value is co-located with the individual pixel value, and wherein the previous pixel filtering weight is determined using a monotonic increasing function of a quantization parameter, a global noise level, and a visual index corresponding to the individual pixel;

encoding the pre-processed video to generate a video bitstream; and storing the video bitstream.

19. The non-transitory machine readable medium of claim 18, wherein spatial-only filtering the individual pixel value comprises a convolution of a neighborhood of pixel values centered around and including the individual pixel value and a two-dimensional filter function having a variance based on the quantization parameter, the global noise level, and the visual index corresponding to the individual pixel of the individual video frame, and wherein the variance comprises a second monotonic increasing function of the quantization parameter, the global noise level, and the visual index.

20. The non-transitory machine readable medium of claim 18, wherein the temporal filtering weight comprises a second monotonic increasing function of the quantization parameter, the global noise level, and the visual index corresponding to the individual pixel of the individual video frame, wherein the visual index comprises a low value for a low visual loss and a higher value for greater visual loss.

21. The non-transitory machine readable medium of claim 20, wherein the weighted average of the previous pixel value and the individual pixel value comprises a sum of the pixel filtering weight multiplied by the previous pixel value and one minus the previous pixel filtering weight multiplied by the individual pixel value.

22. The non-transitory machine readable medium of claim 18, wherein the second video frame comprises a temporally prior adaptive temporal and spatial filtered video frame with respect to the individual video frame.

23. The non-transitory machine readable medium of claim 18, further comprising a plurality of instructions that, in response to being executed on the computing device, cause the computing device to perform video coding by:

determining a coding parameter for the individual pixel value based on the second video frame of the input video, wherein the second video frame is temporally prior to the individual video frame, wherein encoding the pre-processed video stream comprises encoding a third adaptive temporal and spatial filtered video frame temporally subsequent to the individual video frame, and wherein encoding the third adaptive temporal and spatial filtered video frame and applying adaptive temporal and spatial filtering to the individual video frame are performed in parallel.

24. The non-transitory machine readable medium of claim 18, wherein determining the spatial filtering output value comprises a convolution of an N×N neighborhood of pixels centered around and including the individual pixel and a two-dimensional Gaussian filter function having a variance based on the quantization parameter, the global noise level, and the visual index, wherein the visual index has a low value for low smoothing and a higher value for greater smoothing, and wherein the variance comprises a second monotonic increasing function of the quantization parameter, the global noise level, and the visual index.

* * * * *